(12) United States Patent
Kenyon et al.

(10) Patent No.: US 6,724,382 B2
(45) Date of Patent: Apr. 20, 2004

(54) METHOD AND APPARATUS FOR DISTRIBUTING AND DISPLAYING MAPS ELECTRONICALLY

(75) Inventors: Jeremy A. Kenyon, Kirkland, WA (US); Mark N. Law, Victoria (CA)

(73) Assignee: WildTangent, Inc., Redmond, WA (US)

( * ) Notice: Subject to any disclaimer, the term of this patent is extended or adjusted under 35 U.S.C. 154(b) by 292 days.

(21) Appl. No.: 09/768,935

(22) Filed: Jan. 23, 2001

(65) Prior Publication Data

US 2002/0067353 A1 Jun. 6, 2002

Related U.S. Application Data

(63) Continuation-in-part of application No. 09/729,613, filed on Dec. 4, 2000.

(51) Int. Cl.[7] .............................................. G06T 11/00
(52) U.S. Cl. ..................................................... 345/419
(58) Field of Search ................................ 345/419, 672, 345/676, 682, 684, 686, 687, 712, 738, 739, 749, 838

(56) References Cited

U.S. PATENT DOCUMENTS 6,307,573 B1 * 10/2001 Barros ........................ 345/764
6,473,691 B1 * 10/2002 Winter et al. ............... 701/208

* cited by examiner

*Primary Examiner*—Almis R. Jankus
(74) *Attorney, Agent, or Firm*—Schwabe, Williamson & Wyatt, P.C.

(57) ABSTRACT

A method and apparatus for distributing and displaying maps is disclosed. The method involves delivery of maps that are not dynamically generated. The area serviced by a map server is divided into fixed zones for which there are static map tiles. When a map is requested by a user, the location of interest is sent to the server by the user via the users client. The server determines which of a plurality of preexisting map tiles contained the location of interest submitted by the client. A central map tile, from this plurality of preexisting maps, containing the location of interest is sent to the client from the map server. The server may also send preexisting map tiles of the zones immediately adjacent to the zone represented in the central map tile. The server may also support a "mini-map" to facilitate user panning of the "greater area", and points of interest, including multi-media descriptions of the points of interest.

3 Claims, 18 Drawing Sheets

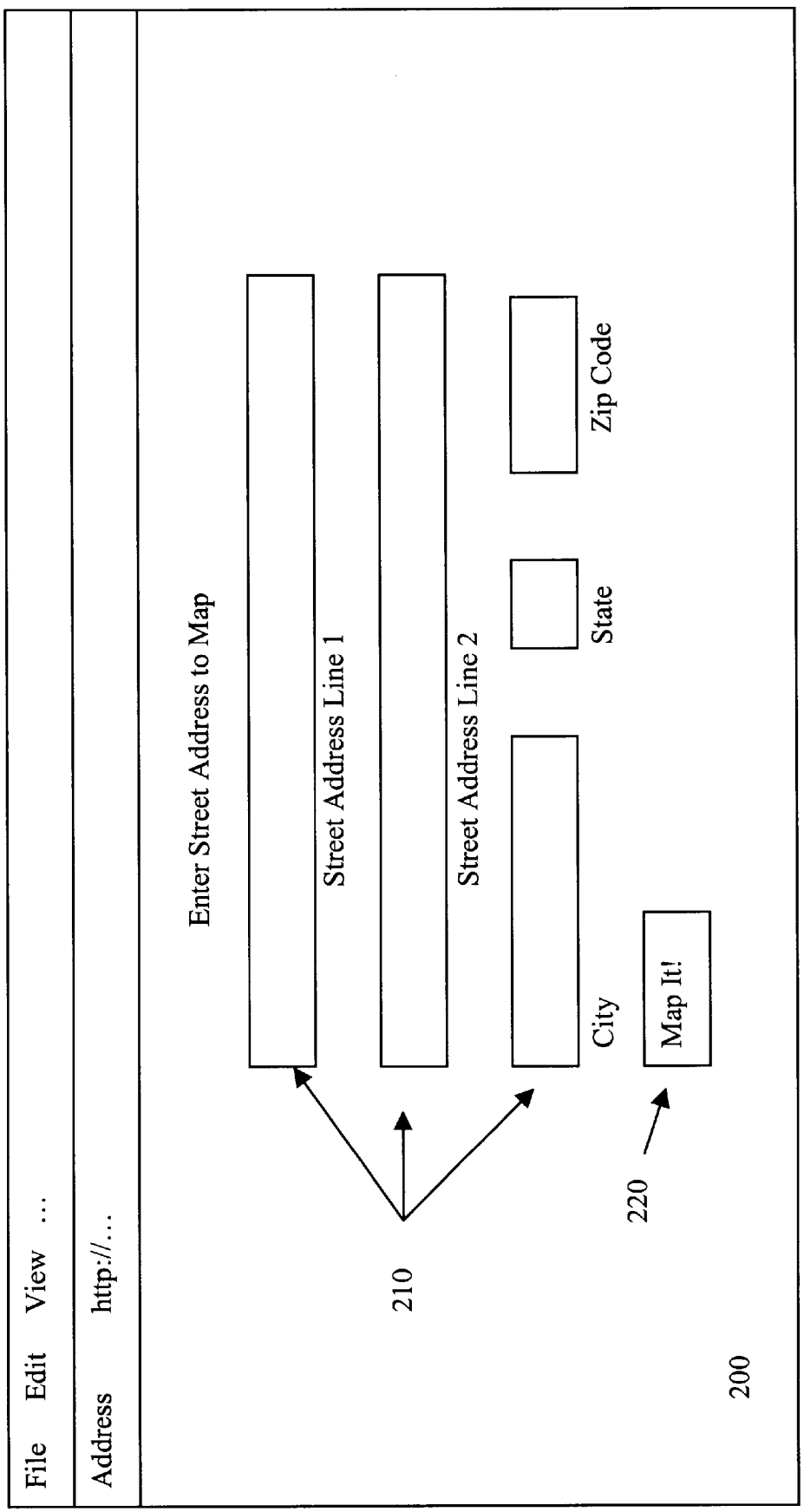

| Zone 22750 | Zone 22751 | Zone 22752 | Zone 22753 | Zone 22754 | Zone 22755 | Zone 22756 | Zone 22757 |
|---|---|---|---|---|---|---|---|
| Zone 32760 | Zone 32761 x←1110 | Zone 32762 | Zone 32763 | Zone 32764 | Zone 32765 x←1115 | Zone 32766 | Zone 32767 |
| Zone 42770 | Zone 42771 | Zone 42772 | Zone 42773 x←1150 | Zone 42774 | Zone 42775 | Zone 42776 | Zone 42777 |
| Zone 52780 | Zone 52781 | Zone 52782 | Zone 52783 | Zone 52784 | Zone 52785 | Zone 52786 | Zone 52787 |
| Zone 62790 | Zone 62791 | Zone 62792 | Zone 62793 | Zone 62794 | Zone 62795 | Zone 62796 | Zone 62797 |

Legend: (x, y) geographical coordinates
[x, y] display coordinates

METHOD AND APPARATUS FOR DISTRIBUTING AND DISPLAYING MAPS ELECTRONICALLY

RELATED APPLICATION

This application is a continuation-in-part application of application Ser. No. 09/729,613 entitled "Method and Apparatus For Distributing and Display Maps Electronically", filed on Dec. 4, 2000.

BACKGROUND OF THE INVENTION

FIELD OF THE INVENTION

The present invention relates to the field of information processing. More specifically the present invention relates to the electronic distribution and display of maps.

BACKGROUND INFORMATION

People at times are presented with an identifier of an unfamiliar location. For example, when looking up an auto repair business in the phone book, the user will have available to them the address of the repair shop. Assuming the person is unaware of the location of the shop, the person would desire to have some help in determining how to navigate to the shop. In general, people would like to have a graphical representation of the location with respect to its surroundings, e.g. a map. Frequently, with the ever-increasing capability and connectivity of the Personal Computer (PC), the location of interest is provided, in some manner, via the PC. Examples of how the locations of interest are provided via the PC include; email from a friend containing the address of a social event, a website containing the address of the local salesroom for a company, and the longitude and latitude of a popular hiking destination via a popular outdoor magazine website.

There are currently several websites that offer the capability for a user to obtain a graphical representation, i.e. a map, of a street address. In response to providing the address, the user will be provided a map that shows the area surrounding the provided street address. On this provided map, the user will be able to perform various operations. One of these operations is zooming in and out on a map. Zooming is the ability to see more or less of an area surrounding the requested location. This usually happens at the expense of resolution since one is looking at a greater area in the same amount of view space. Another ability is the ability to "pan" in any direction that the user chooses. In other words, to have the map stay at a given level of resolution but have the map "move" the area covered by the current view space in a particular direction.

The most notable deficiency with the current map serving products is that the time required to have a map provided to a user can be lengthy. This is because of the method by which the current map servers provide the maps. First, the address is provided to the server by the user from the client machine. Second, the server will generate, in real time, a map containing the address provided to the server from the client. Finally, when the generation of the map on the server is complete, the map image is sent to the client from the server. Each subsequently required map, i.e. as a result of the user zooming or panning, is also generated and delivered in this real-time manner. The use of one of these prior art products demonstrates the negative effects associated with the dynamic generating of these maps. These negative effects are the major motivations for the present invention. The reason that dynamically generating a map is an issue is two-fold. First, the processing power required to generate real-time graphics is extensive. Second, the use of real-time graphics for each map implies generation of a new map with every request associated with an existing map.

Since the prior art process involves the real-time generation of the graphical images, the server will be spending time generating these images real-time. Map generation on the server is a relatively time consuming process and can make the overall processing time of getting the map to the user quite lengthy. This is especially true as the connection speeds with which most users access the Internet increases. As the user access speed increases, the time that it takes to transfer the bit map to the user become less of a factor thus making the map generation delay even more noticeable.

There is another consequence of the real time generation of graphical images. As previously mentioned it requires processing power to produce real time graphical images. To provide the ability to service many clients with real-time maps would require significant processing power. Therefore a site wishing to provide maps to a large number of clients will need to either have access to a great deal of processing horsepower or have a large delay for users while the requests for maps are queued. Neither requiring the server owner to provide more processing power nor having a large delay for users waiting for maps is a desirable trade-off.

The second reason that dynamically generated maps are an issue is that every map is custom. Specifically the deficiency has to do with the inability to manipulate a map once it has been provided to the client. Frequently, the user may want to see a different area relative to the location of interest (e.g. to pan or move the current display). The current solutions current solutions always contact the server. The server generates another map in real-time and this map is sent to the requesting user. This generation of a new map every time that a user requests a new view is frustrating to the user.

Thus a more effective approach in providing and delivering maps to the user is desired.

SUMMARY OF THE INVENTION

The present invention provides a method and apparatus for distributing and displaying maps to a client. A client provides an identifier of a requested location to a map server. The map server has available to it a plurality of preexisting map tiles collectively covering the area supported by the particular map server. For example, if a map server is to provide information about the area covered by a particular country, it is pre-provisioned with the map tiles that cover the country. The supported area will be divided into a plurality of zones. Each zone will be represented by one map tile. The server will determine which map tile in the plurality of preexisting map tiles contains a representation of the requested location. The server will send at least this map tile to the client.

In an embodiment of the present invention, the location requested is provided in the form of a street address. In an alternative embodiment, the location is requested in the form of longitude and latitude. For either case, the server will send, in addition to the map tile, an indication of, or the logic to generate such indication, where on the map the location of the requested street address or the longitude and latitude would reside. The client will then add a marking on the map, prior to displaying it to the user, which indicates the location on the map of the requested longitude and latitude. The indicator is rendered by the client along with the "visible portion" of the map tiles.

When a supported area is divided into zones, as in the case with the present invention, there will, in most cases, be zones that are immediately adjacent to the central zone. The central zone is the zone which contains the requested location. In an embodiment of the present invention, a set of preexisting map tiles of the zones immediately adjacent to the central zone will also be sent to the client. The combination of all of the zones immediately adjacent to the central zone combined with the central zone itself will be termed the first inner area. In another embodiment of the current invention, a second set of preexisting map tiles representing the zones immediately adjacent to the first inner area are also sent to the client in addition to the first set of preexisting maps corresponding to the zones immediately adjacent to the central zone. The combination of the first inner area with the zones immediately adjacent to the first inner area will be termed the second inner area.

In one embodiment, each of the pre-existing map tiles also has a corresponding miniaturized version, and the miniaturized versions are sent to the client along with the corresponding "full sized" versions of the map tiles. For the "initial" request, certain "mini-map" processing logic are also sent. The "min-map" processing logic causes a mini-map of the "greater area" to be formed and displayed on the client, using the miniaturized versions of the map tiles. Additionally, the "mini-map" processing logic further causes a "visibility window" demarcation corresponding to the visible portion(s) of the "full sized" map tiles to be displayed over the "mini-map". The "mini-map" processing logic further facilitates user movement of the "visibility window" demarcation within the "mini-map". In response, the "mini-map" processing logics causes the displayed map to be refreshed with the appropriate adjacent zones, as if the user has communicated the desired panning movement via conventional cursor movements on the "full sized" display. As a result, usability of user panning is further improved.

In one embodiment, each of a number of the map tiles also has point of interests, and each of these map tiles has associated data describing and facilitating the display of the points of interest. The associated data are also provided to the client along with the map tiles. Additionally, for the "initial" request, certain "point-of-interest" processing logic is also provided to the client. In one embodiment, the "point-of-interest" processing logic provides a drop down list for a user to select to have points of interest of a selected type to be displayed. In response to one such selection, the "point-of-interest" processing logic causes graphical representations of the points of interest of the selected type to be displayed at the appropriate locations of the displayed map. Furthermore, in response to the placement of a cursor within a predetermined distance from a displayed point-of-interest, the "point-of-interest" processing logic causes multi-media data associated with the particular point-of-interest to be rendered.

BRIEF DESCRIPTION OF THE DRAWINGS

FIG. 2A—One embodiment of the client interface for location input in the present invention.

DETAILED DESCRIPTION OF THE INVENTION

The present invention is a method and apparatus for distributing and displaying maps in an electronic system. The detailed description herein is intended to provide a person skilled in the art with the required information to practice map distribution and displaying via this improved method. The invention disclosed is not intended to be limited to the embodiments discussed herein. Rather the embodiments are mere example implementations of the invention described. Those skilled in the art will understand that the embodiments shown can be modified to produce other embodiments by applying the principles herein described. The document is to be interpreted in the broadest scope possible keeping within the spirit of this invention.

High-level System

Figure 1:
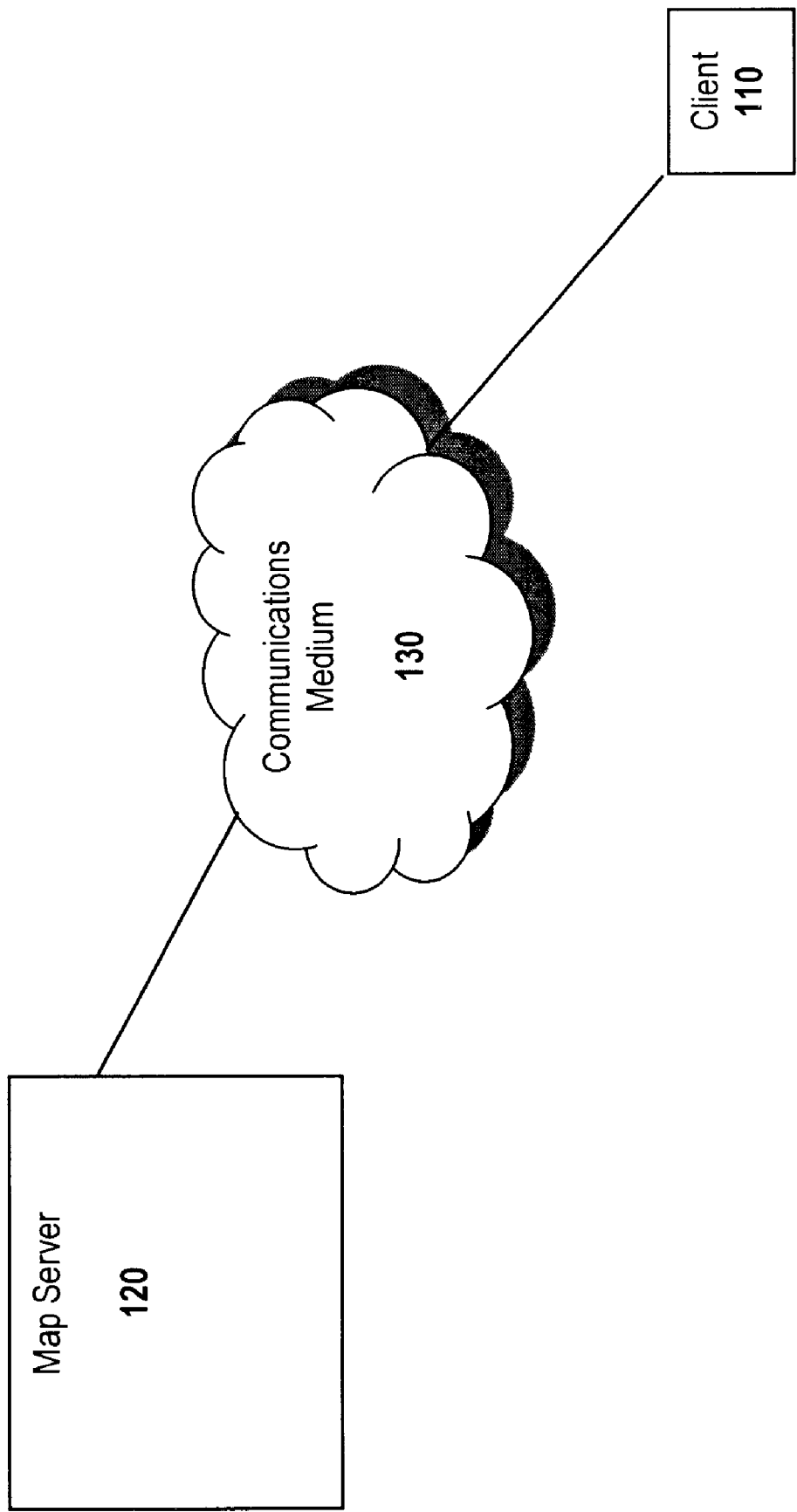
FIG. 1—Block diagram illustrating a system view of an embodiment of the invention.

FIG. 1 shows a block diagram of a system view of an embodiment of the system of the present invention. In this embodiment, there exists a client 110 that will send an identifier of a requested location in an area supported by a map server, via a communications medium 130, to a server 120 incorporated with the tile based map delivery invention of the present invention. The server 120 will advantageously provide the client with a map of an area comprising the location provided to the server, in accordance with the present invention.

The communications medium 130 can be wired or wireless. The communications protocol employed thereon may be any one of a number of communications protocols known in the art, e.g. TCP/IP. In an embodiment of the present invention, the map server may be connected to the client via the Internet. For example, the client may be a user of a Personal Computer (PC) with the address of a local post office who accesses an Internet based map server to look up the location of the post office using a dial-up connection to his/her Internet Service Provider (ISP). In another embodiment, the client may be connected to the server wirelessly via a wireless connection. For example, a user who is servicing factory equipment may have a Personal Digital Assistant (PDA) with a wireless network adapter.

The user may have the grid coordinates of a faulty machine. The user can submit the grid coordinates of the faulty machine, via a wireless connection, and the map server will serve up a map showing the location of the faulty machine.

The area serviced by the map server may be any area capable of being represented by a map. Most applications in this area are focused on geographic areas, however the current invention is not limited to this usage. As shown in the example above, the area covered by the service of a map server may be the layout of an industrial complex or a factory building.

The identifier of a requested location may be any indicator of a particular location in the area of service covered by the map server. For example, if the area serviced by a map server is a geographic area bounded in a state, the user may be able to provide a street address as an identifier. Another method of providing an indicator of a particular location is through a longitude/latitude pair. As another example, in the case of an area of a campus or an indoor facility, the location may be a grid location as defined in the plans for the campus or indoor facility.

Client Side

Figure 2B:
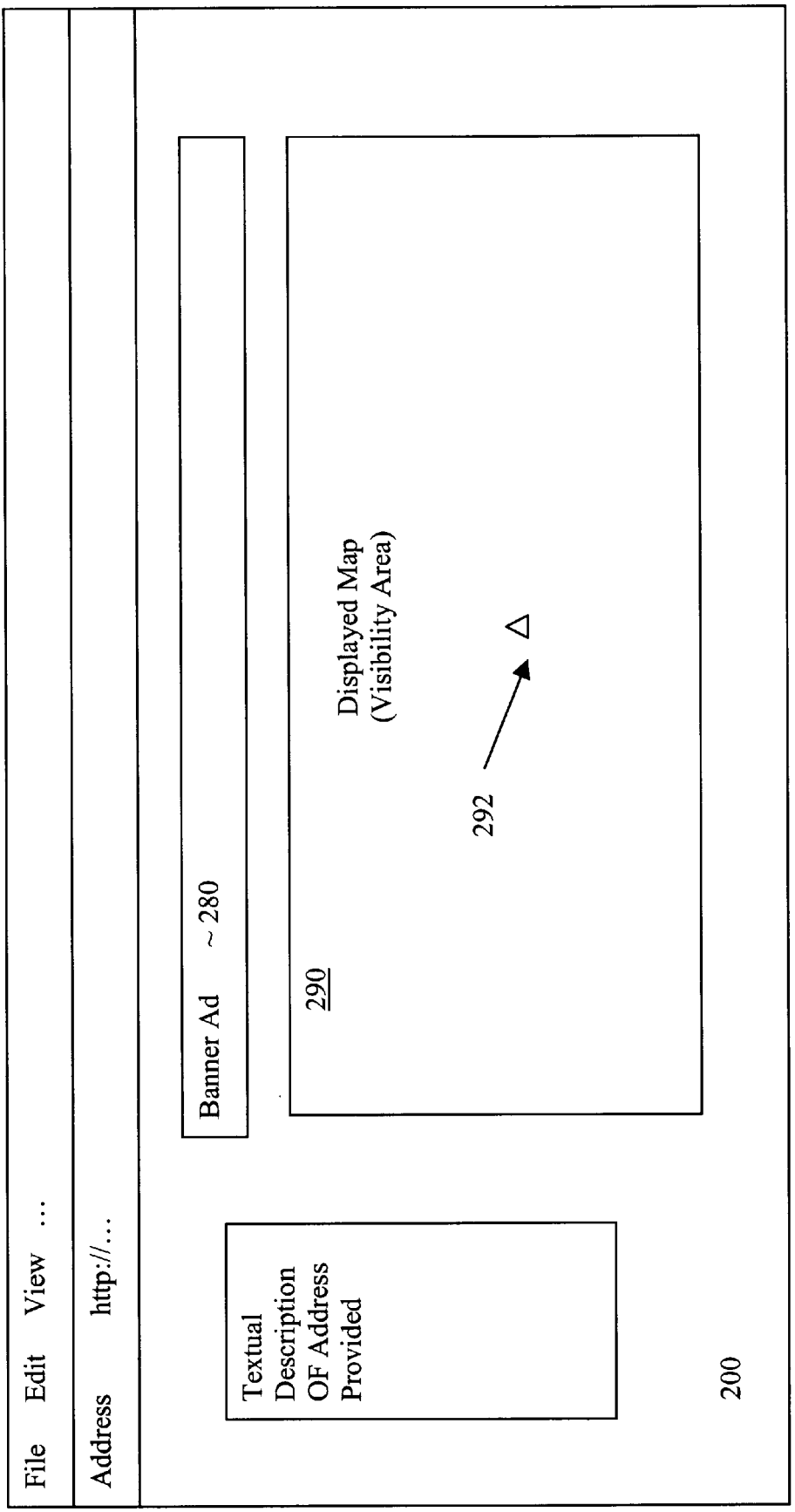
FIG. 2B—Display of one embodiment of the client interface for the present invention including rendering visible area of map tiles.

As shown in one embodiment of a client in the present invention, in FIG. 2A, the client is a generic user agent, such as a web browser, running on a Personal Computer (PC). After loading a page that provides fields for inputting a street address 210, the user types in the street address as the identifier of a requested location. When the user instructs the client to do so 220, the client will send to the server the identifier of the requested location, in this case a street address. The client will then wait for the map server to send the appropriate map tiles and rendering instructions to the client. As shown in FIG. 2B, when the map tiles and rendering instructions have been returned to the client, the client will then display a map of an area 290 comprising the requested location 292 on the user display area 200 using the received map tile and rendering instructions. In one embodiment, the map will be sent along with an indicator, or the logic to generate the indicator, indicating the location 292 of the street address on the displayed map 290.

The client may be any electronic device capable of performing the following; connecting to a map server via a communications medium, using a known communications protocol, sending an identifier of a location, receiving back the map tiles from the map server and displaying the visible area of the map tiles to the user. Examples of this type of client include a Personal Computer (PC), a Personal Digital Assistant (PDA), a mobile phone, and a transceiver with graphic display in a motor vehicle.

Server Side

Figure 3:
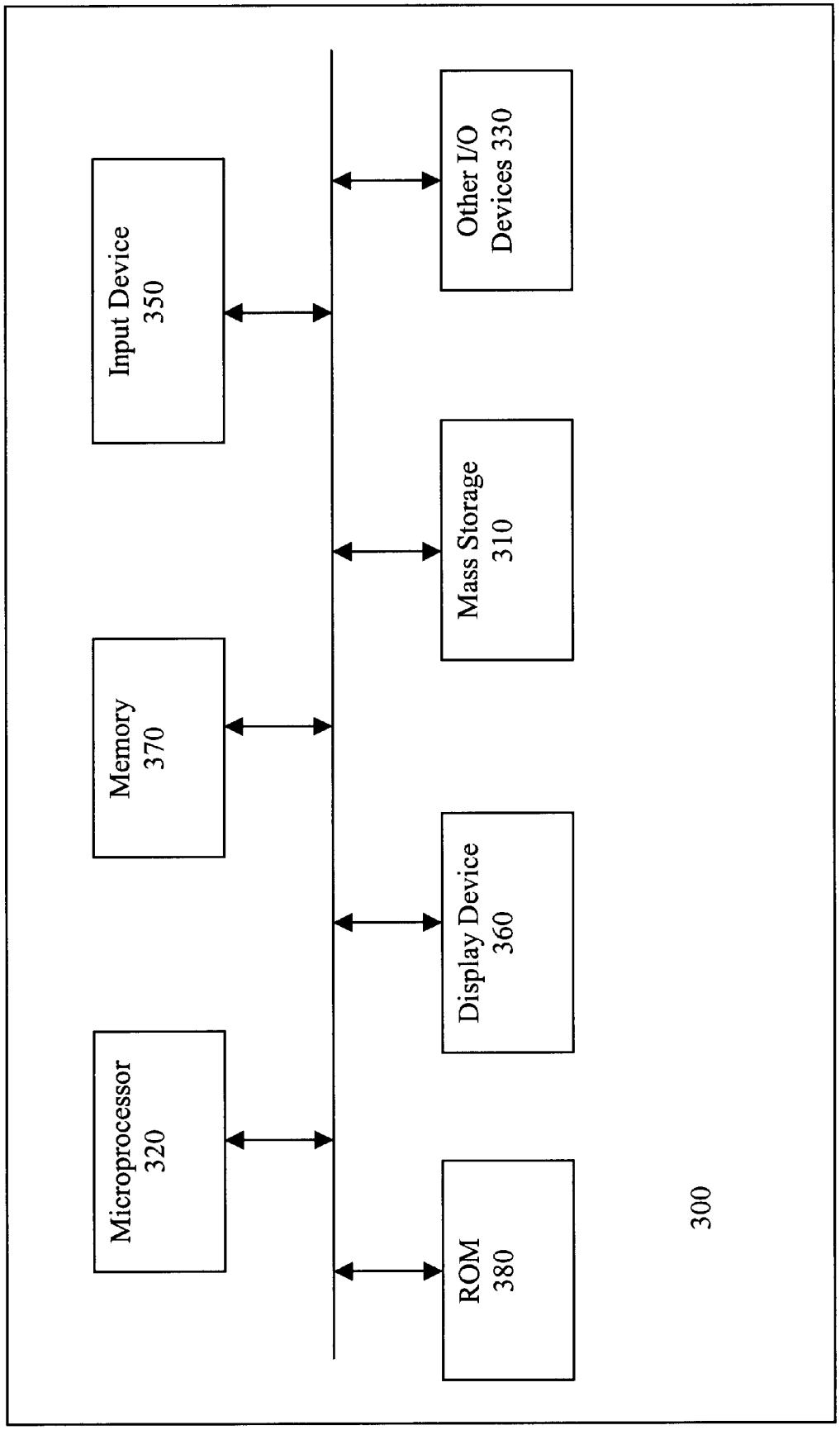
FIG. 3—Typical embodiment of server architecture

FIG. 3 shows an embodiment of a server device for the present invention. The server is implemented on a computer system. Computer systems are well known to those skilled in the art and will not be discussed in significant detail. Several items of the computer system are of special interest to the present invention and will be addressed as needed.

Figure 4:
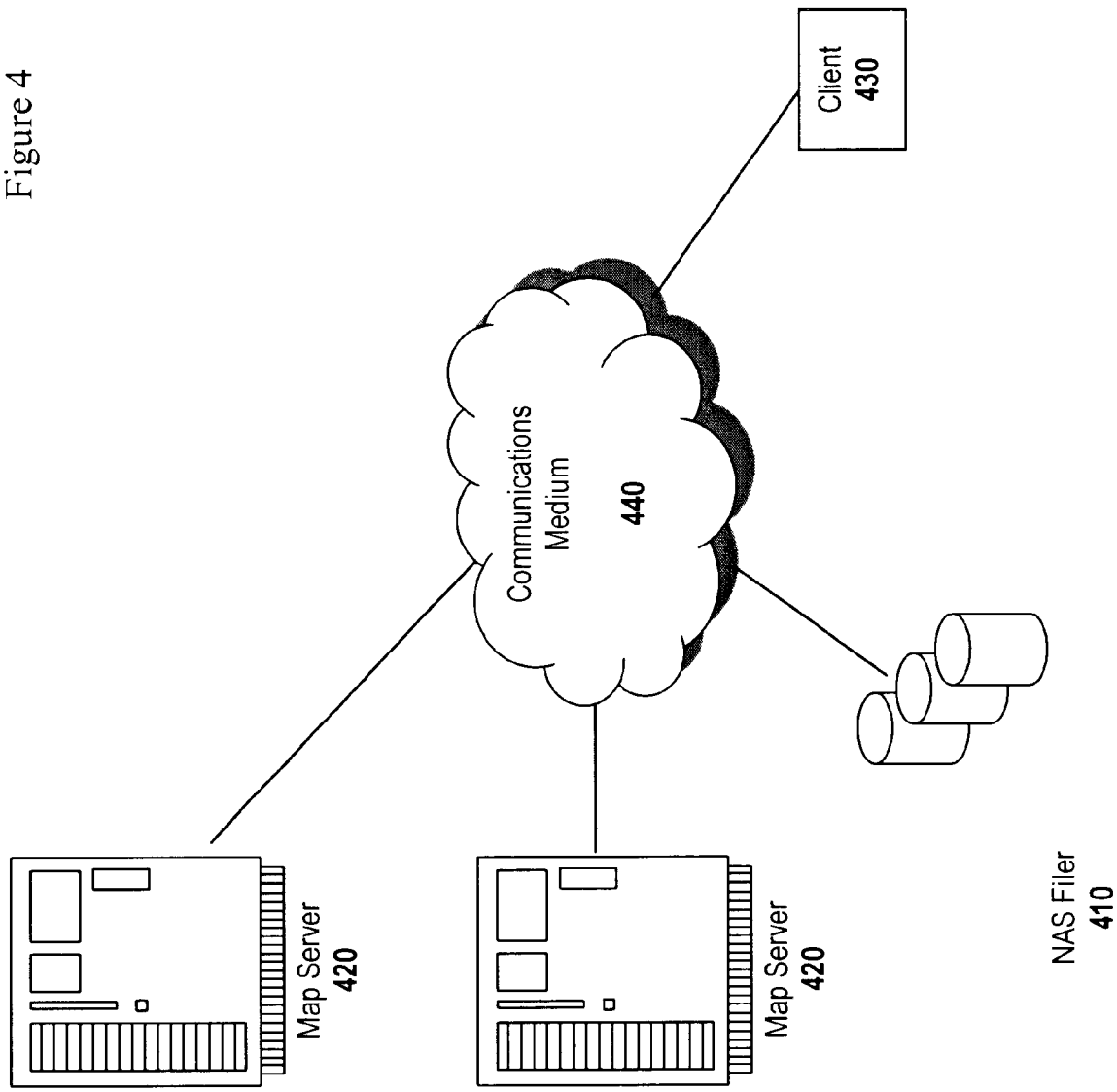
FIG. 4—Embodiment of invention with a Network Attached Storage filer.

Note that the computer system of FIG. 3 contains mass storage 310. In this embodiment, the map images are stored on this mass storage device. If the map server is tasked with serving a large geographic area with detail, the amount of storage is scaled to provide the necessary storage. Alternative embodiments of the current invention can provide a reasonable response time without the need for more expensive hardware. FIG. 4 shows an alternative embodiment of two map servers on a network with a Networked Attached Storage (NAS) filer 410. In this embodiment, map server 420 handles the request from the client 430. The map tiles are stored on NAS 410 and selectively provided to the client. This provides at least one advantage, as the NAS is a dedicated, high-performance, high-speed communicating single purpose machine, it can be shared between map servers thereby reducing the need for additional storage at each server. Further, they can off-load the file server requirements from the map server thus providing the map server with the ability to handle more clients.

Figure 5:
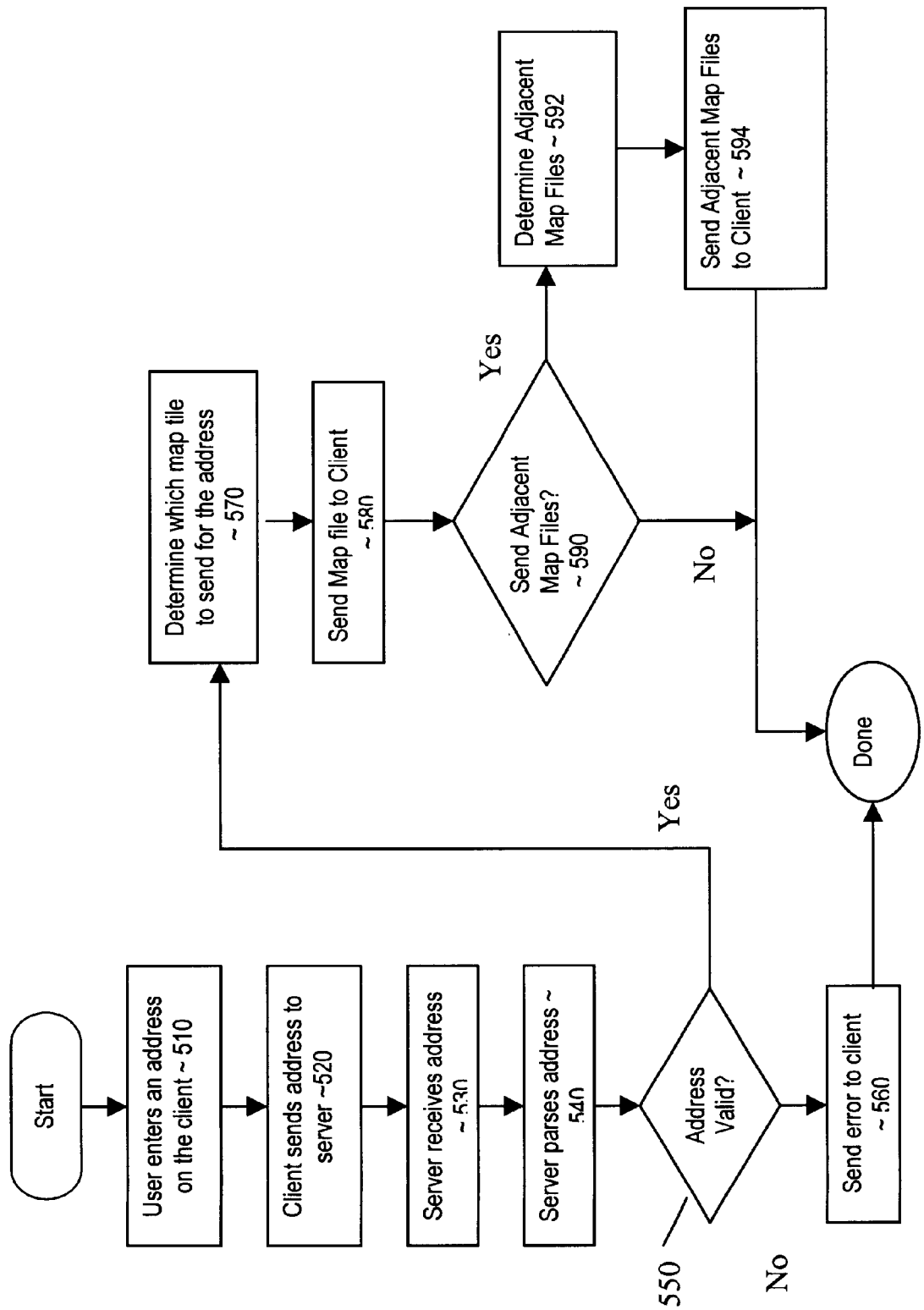
FIG. 5—Flowchart for one embodiment of the present invention method.

FIG. 5 shows a flowchart that describes the behavior of an embodiment of the present invention. This embodiment consists of a system that utilizes the client of FIGS. 2A and 2B, with an address in the United States, and the server of FIG. 3. In step 510, the user enters an identifier of a requested location, here a street address 210, into the client browser 200. After the user clicks on a button 220 instructing the client browser 200 to send the address to the server 300, the client sends the address to the server 520. The server 300 receives the address 530 and parses the address 540. The server 300 checks to see if the address is of a valid format and if the address is contained within the area supported by the database of the server 550. If the address meets both of these requirements, it is accepted and further processed. Otherwise, an error is sent back to the client 560 indicating either "improper address format" error message or an "area not supported" error message.

Central Map Tile

The supported area may be a single contiguous area or multiple, non-contiguous areas. For example, the supported area may cover the entire surface land area of the earth, a single country, an area of several states or a neighborhood in a metropolitan area. As mentioned above, the invention may also cover several non-contiguous areas. For example, a provider of this service may decide to provide support to both the east and west coast areas of the United States but not the inlands area. The invention may also be used at the level of a company wherein a corporate campus may be the area. Similarly, the area may be limited to the interior of a building.

In accordance with the present invention, the areas supported are divided into smaller areas called zones. Each zone can have one map tile corresponding to it. A map tile is therefore a representation of a zone. Any representation of a portion of the area supported by the server can be represented by combining multiple map tiles. The zone containing the requested location is the central zone and the corresponding map unit that represents this zone is the central map unit.

For each zone there will need to be an indication of which set of locations is to be covered by each zone. For example, in the case of longitude and latitude with rectangular zones divided by a minimum and maximum latitude and longitude, this minimum and maximum information would need to be associated with each zone.

As mentioned previously, FIG. 5 shows the flowchart for an embodiment of the present invention wherein the area covered is that of the United States. If the address is accepted 550 as described above, the next step is for the map server 300 to determine which map tile represents the zone in which the requested location is contained 570. In the embodiment described in FIG. 5, each zone is determined by a zip code. Therefore, the zip code from the address is used to determine which map tile of the plurality of preexisting map tiles is to be sent to the client 580 as the central map tile. In this embodiment, no adjacent map tiles are to be sent (adjacent map tiles will be discussed subsequently). As a result, the query for adjacent map tiles step 590 in FIG. 5 is answered in the negative and the process is complete.

In the current embodiment, each map tile is contained in a single file. Note that this is not a requirement of the current invention. A file may contain multiple map tiles, or a map tile may be divided among multiple files. At least the file containing the map tile is sent to the client 580. Note that since the user has the map tile for the entire central zone, any panning around the location, while staying in the central zone, can be updated by the client immediately. This is a significant advantage over the prior art. When the user requested another map in the prior art, for example, a new bit map from the server was required.

Figure 6:
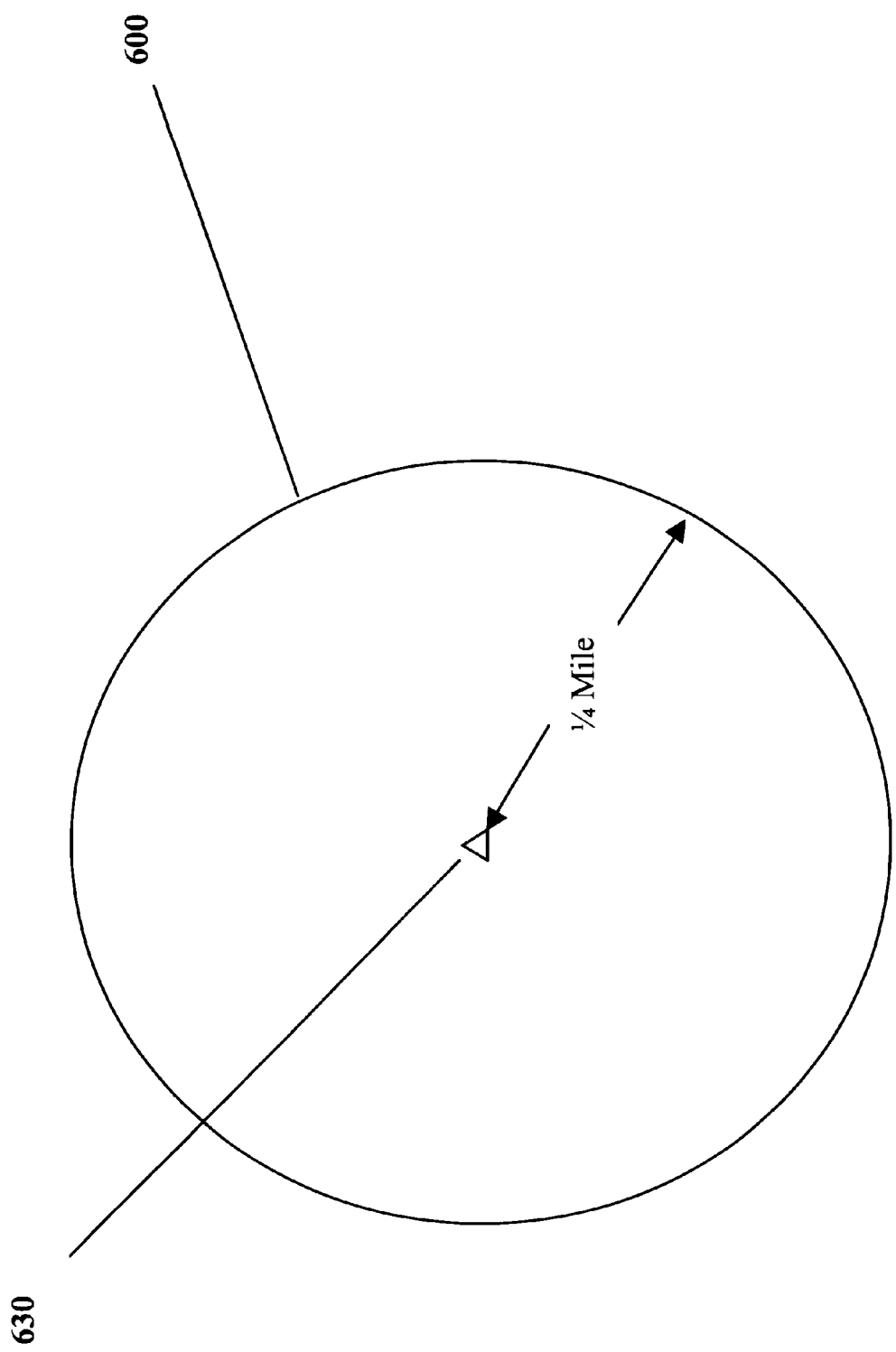
FIGS. 6 and 7—Embodiment showing a requested location near the meeting of two zones.
Figure 7:
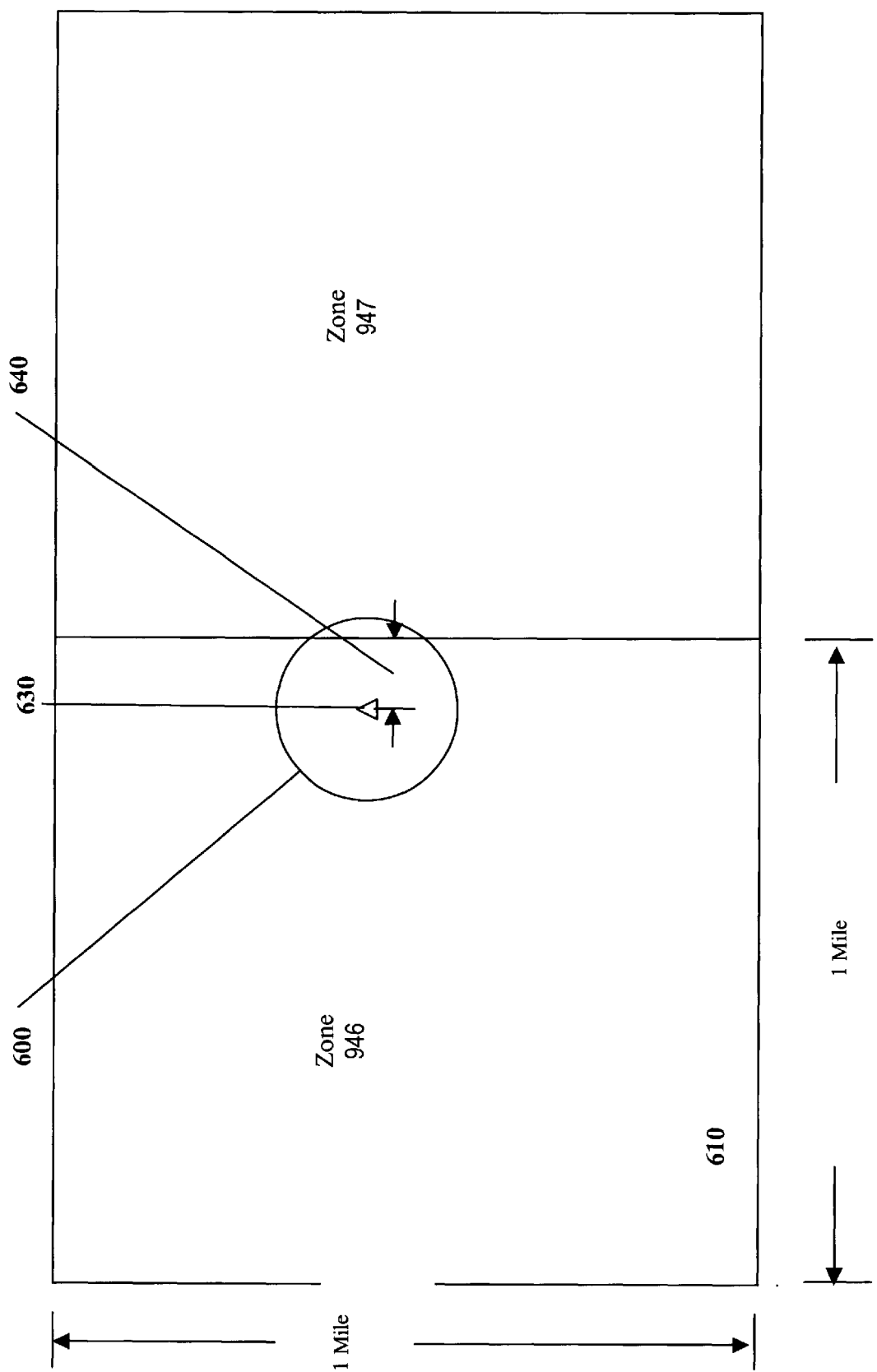

As mentioned already, each supported area is divided into zones. Each zone corresponds to a map tile. There are times when a single map tile is not sufficient or desirable. FIGS. 6 and 7 shows an example of such a situation. FIG. 6 shows the location 630 to be requested by the client. The requested location is shown in a circular region 600 that shows the default display region for the client, e.g. the visibility area, upon receipt of the map tiles from the map server. FIG. 7 shows the position of the requested location in relation to the zones representing existing map tiles. Zone 946 represents the central zone for the requested location. Note the proximity of the requested location to the immediately adjacent zone 947. In this embodiment of the invention, the client is to have a visibility area of ¼ mile in radius 600 surrounding the requested location 630. The distance from the requested location to the edge of the central map tile containing the requested location is 750 ft 640. This distance is less than that required for the visibility area of the client. As a result, in this example, two corresponding map tiles representing the two corresponding zones will need to be sent to the client, map tiles for zones 946 and 947.

In one embodiment of the current invention, when the central map tile is sent to the client, additional information comprising the identification of the zones immediately adjacent to the central zone is also sent to the client. Zones immediately adjacent to a given zone are those zones that share a common boundary with the given zone. For example, the URL of the map tiles that correspond to the immediately adjacent zones will be sent to the client. When additional map data is required, as mentioned previously with respect to the panning operation, the client determines, based on the area where the required data is needed and the identifiers of the immediately adjacent maps, which additional zones are required and it requests these map tiles from the server. This process will be discussed in further detail in subsequent text.

In another embodiment of the present invention, the naming convention of the zones implicitly provides identification of the zones, and consequently the URL of the corresponding tiles, immediately adjacent to a given zone. For example, referring again to FIG. 7, if the central zone is zone number 946, and we are interested in retrieving the zone immediately to the east (right) of the zone, we know via a naming convention (e.g. that maps are numbered sequentially in ascending order, moving to the east) that the zone being requested is zone 947. In this embodiment, the URL for this map tile will be determinable from the zone identifier. In another embodiment, the naming convention is a function of the geographic coordinates of a predetermined anchor point of zone, e.g. its centroid, its top left corner, and so forth.

Visibility Area

The visibility area is that portion of the downloaded map tiles that are displayed on the user client. Referring again to FIGS. 6 and 7 in combination with the client as described in FIG. 2B, we see an example of a visibility area 600. In this embodiment two map tiles are sent to the client. The two map tiles sent are for zones 946 and 947. However, the entire area covered by each of these map tiles is not to be displayed by the client. In this embodiment of the invention, the client is to display a circular region with a radius of ¼ mile 600 from the requested location, this is the visibility area.

In an embodiment of the present invention, the client determines the visibility area. In an alternate embodiment, the server provides information to the client about the visibility area. Refer to FIG. 2B and the example of a generic user agent in the form of a web browser. In this embodiment, there are two other images that are being displayed in the browser. The first shows a banner ad 280 and the second shows a text box with information about the requested location 290. The map server in this embodiment will send these images along with the proper javascript code to the web browser to display these images in the proper location. These images and code are sent by the map server to the browser along with the required map tiles. However, as previously mentioned for this embodiment, the entire area covered by the provided map tiles is not to be displayed. In this embodiment, additional code will be sent to the client agent to aid in the display of the proper visibility area. In particular, with this embodiment, the server will send information on what portion of the map tiles will be displayed to the user. This will allow the client to render the proper visibility area.

Maps of Immediately Adjacent Zones

Figure 8:
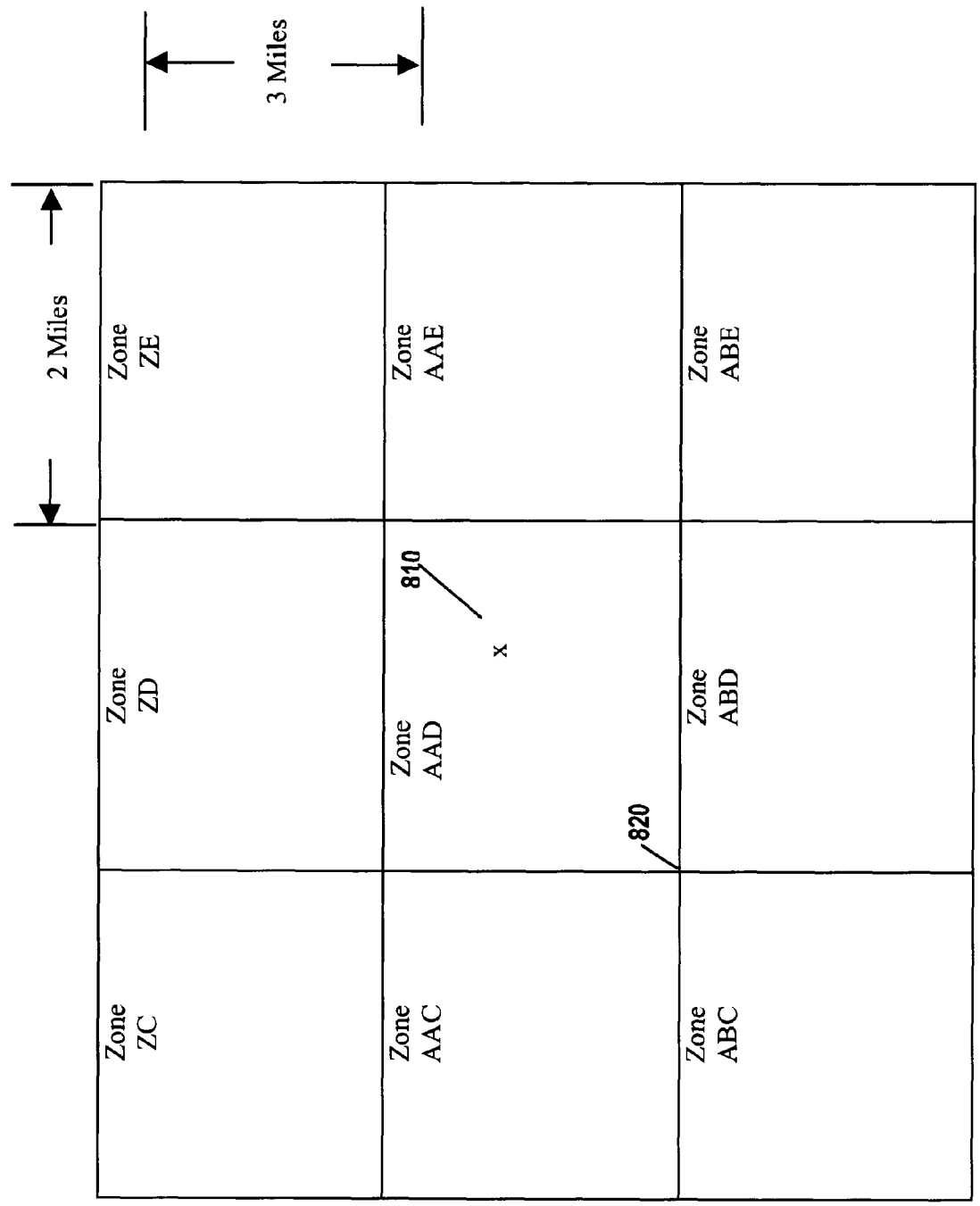
FIG. 8—Embodiment showing zones immediately adjacent to the central zone.

Referring back to FIG. 5, assume that the answer to the question on sending the adjacent maps was answered in the affirmative 590. After the map tile of the zone containing the requested location is sent to the client 580, without an explicit request from the client, the map server determines which zones are immediately adjacent to the zone containing the requested location 592. FIG. 8 shows the central zone AAD of FIG. 7 and additional zones immediately adjacent to the central zone. In the case of central zone AAD, these immediately adjacent zones are ZC, ZD, ZE, AAC, AAE, ABC, ABD, and ABE. In this embodiment, the server will be configured to send these map tiles to the client as soon as they are available 594.

Figure 9:
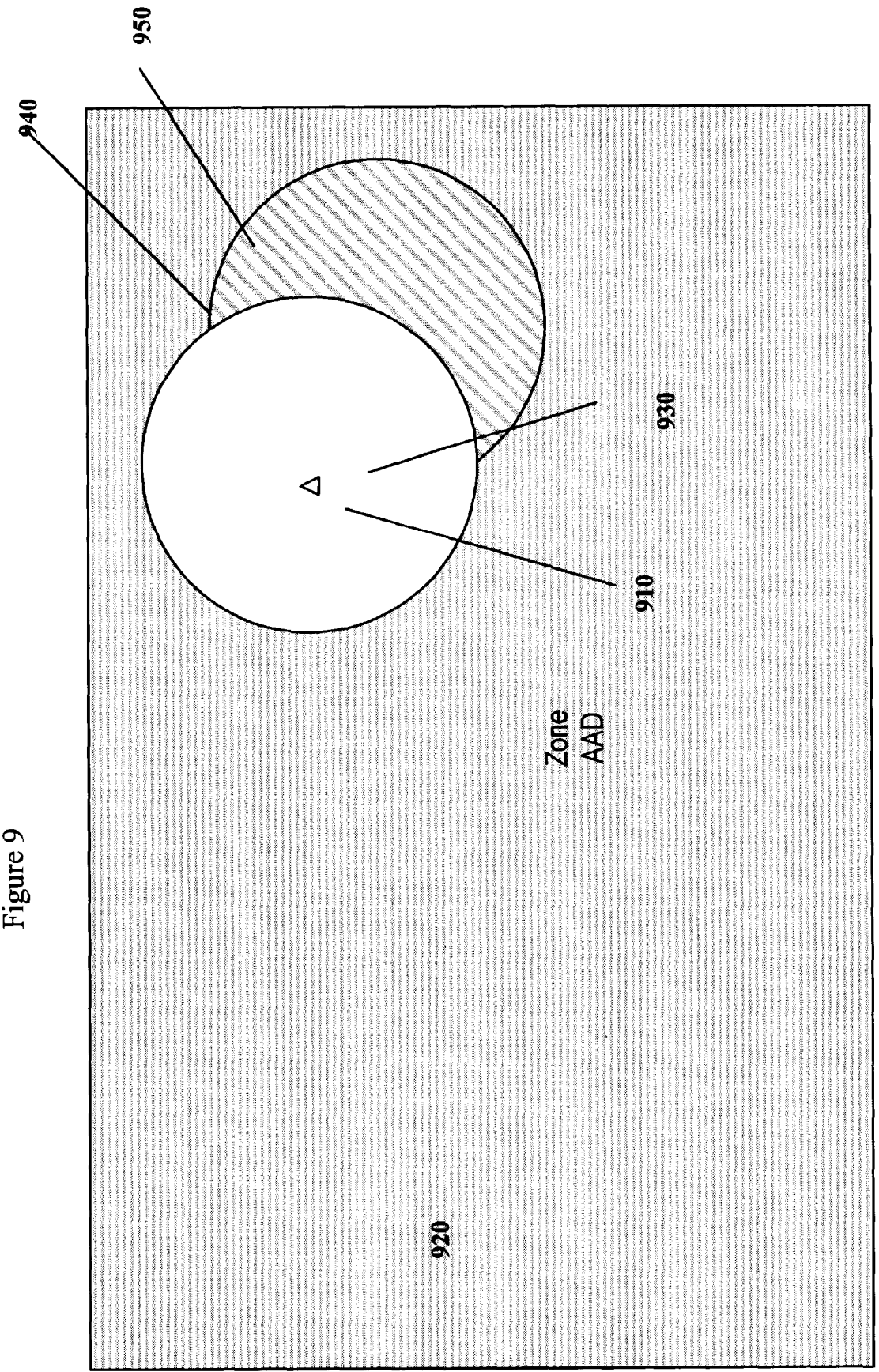
FIG. 9—Embodiment showing requested location near the edge of a zone and the effect of panning east.

To see how the sending of adjacent zones can be used beneficially, consider the situation of FIG. 9, where the user has been provided with zone AAD 920 for the requested location 910. The user may be interested in trying to find the nearest freeway. The user believes that the freeway of interest may be east of the default visibility area shown 930. In this case, the user can pan in an easterly direction. Assume that the user pans and the new area required is that shown in 940. As shown in FIG. 9, area 950 would be required but not available. As discussed above, if the immediately adjacent map tiles are available, a request to pan east will not result in a request of additional data.

When the set of map tiles of immediately adjacent zones along with the map tile for the central zone have been sent to, and received by, the client, the client has received a first inner area.

Second Layer of Adjacent Maps

Ideally, to minimize requests for additional data, it would be desirable to send the entire area, serviced by the map server, to the client. However, this is not practical as the storage area on the client would not likely be able to accommodate this amount of data. Additionally, the time required to transfer this data would provide little value to the user. Nevertheless, it would appear that, depending on the configuration of the client with respect to the details of each map, there may frequently be a desire to have more than a first inner area sent to the client.

Figure 11:
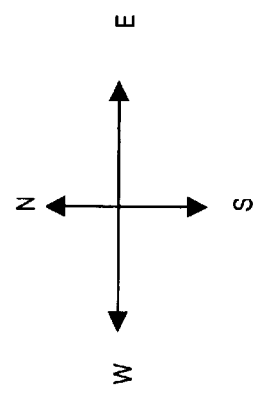
FIG. 11—A map showing the zonal division of an embodiment of the present invention.

Referring to FIG. 11, we see a portion of an area serviced by a map server. Assume that the location represented at 1150 is a requested location to a map server. In the embodiments discussed, the central map tile of zone 42773 would be sent to the client. Additionally, the map tiles of the immediately adjacent zones would be sent to the client. In this example, this would be zone numbers 32762, 32763, 32764, 42772, 42774, 52782, 52783, and 52784. In different embodiments, these map tiles may be sent either with the map tile of the central zone or separately from the map of the central zone.

It is desirable in certain cases to have sent to the client, upon an initial request for a map from the map server, a wider area then that of the first inner area. In an embodiment, the server will send, in addition to the first inner area, those maps adjacent to the maps of the first inner area that have not already been sent to the client. For example in FIG. 11, as discussed above, a request for a first inner area will result in the maps of nine zones being sent to the client. In this embodiment, 16 other zones surrounding the first inner area will be sent to the client. These zones are 22751–22755, 32761, 32765, 42771, 42775, 52781, 52785, and 62791–62795. These zones, combined with the first inner area constitute a second inner area. The sending of the second inner area will result in less of a likelihood of generating a request for additional data when panning. This procedure can be used to send a discrete, but flexible area surrounding the requested location.

Mini-Map

Figure 12:
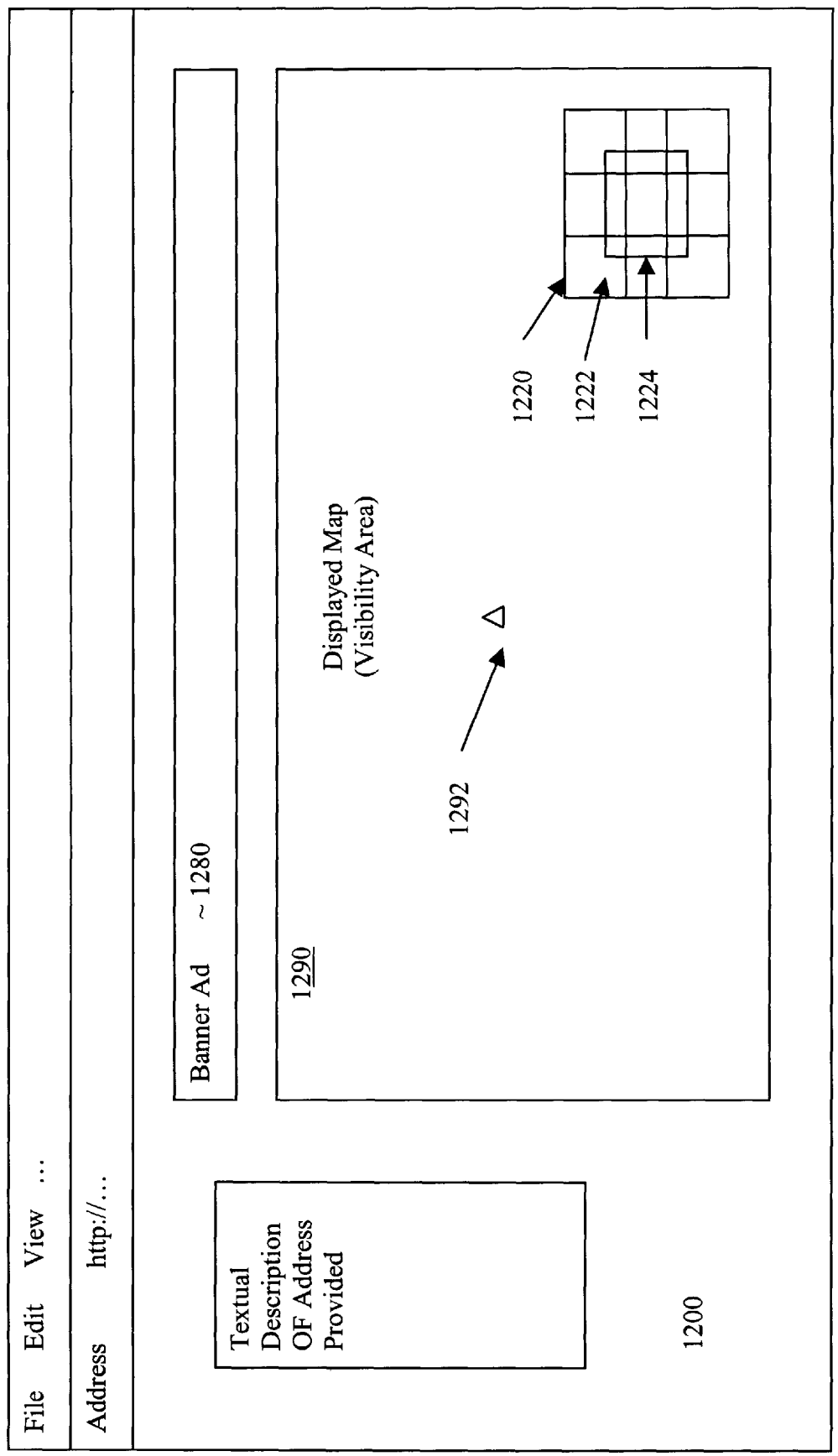
FIG. 12—An end user view of the "mini-map" feature of the present invention.
Figure 13:
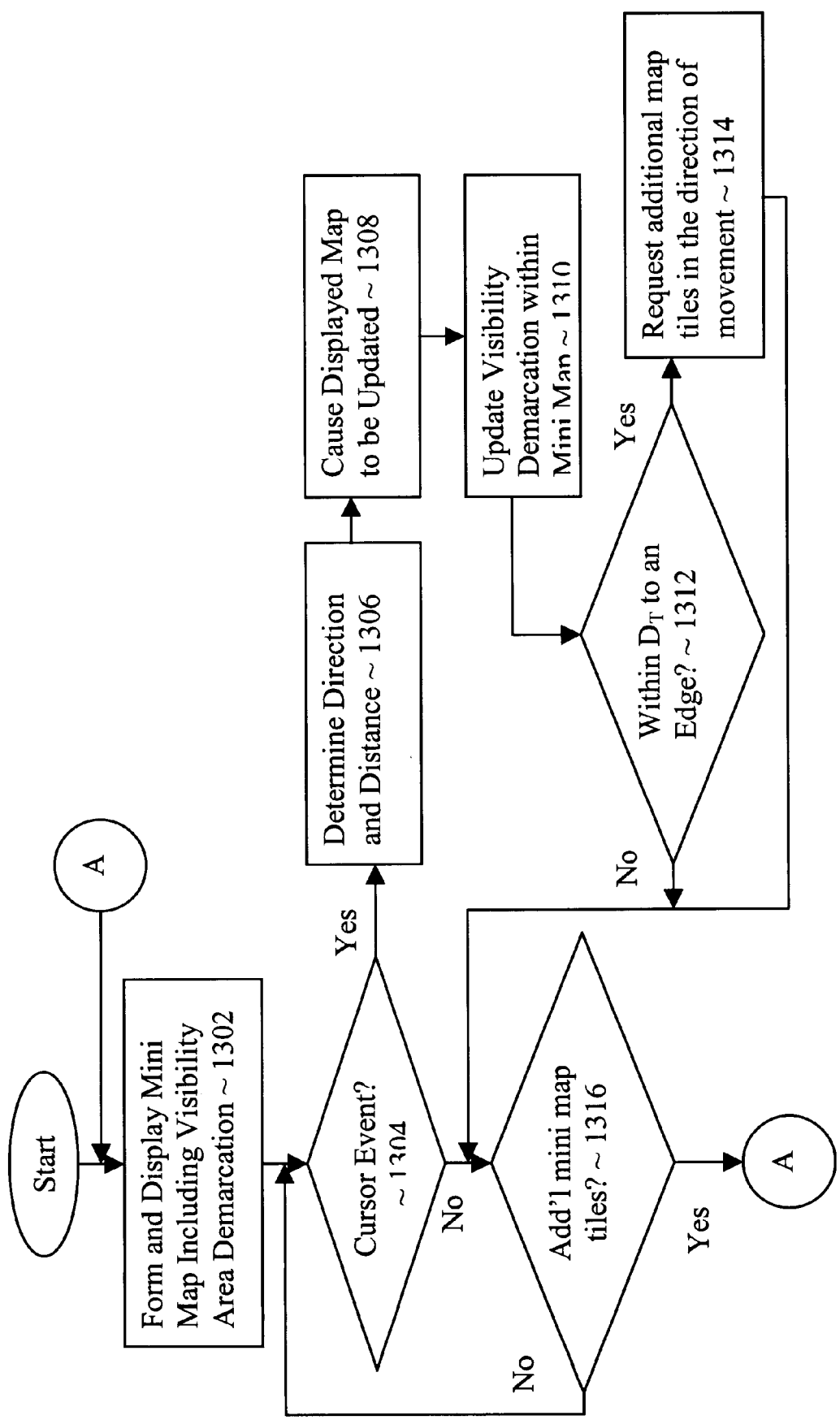
FIG. 13—A flow diagram of the operational flow of the relevant aspects of the "mini-map" processing logic of the present invention.

Referring now to FIGS. 12 and 13, wherein a block diagram of a user view of the present invention, illustrating an additional "mini-map" feature, and a flow diagram of the operational flow of the relevant aspects of the "mini-map" processing logic, are shown. As will be readily apparent from the descriptions follow, the "mini-map" feature improves the usability of user panning for electronic map distribution and display. As illustrated in FIG. 12, in conjunction with a map display, a "mini-map" 1220 of the "greater area", together with a "visible area" demarcation window 1224, are also provided to assist a user in panning around the "greater area" surrounding the requested location 1292.

The "visible area" denoted by demarcation window 1224 corresponds to the area represented by display map 1290. The "greater area" represented by mini-map 1220 corresponds to the totality of the zones represented by the map tiles provided. The "visible area" demarcation window 1224 is moveable by the user, in any direction, and for any amount of distance (as long as the incremental areas remain supported by the map server). Corresponding to the user movement of "visible area" demarcation window 1224, the displayed map 1290, and optionally the "greater area" are refreshed accordingly.

To enable provision of this feature, a miniaturized version of a tile, is provided for each pre-existing map tile (hereinafter, the "miniaturized" and the "full sized" versions). Moreover, the miniaturized versions are provided to the client along with the corresponding "full sized" versions. For example, in the earlier described example where pre-existing map tiles of the immediate "ring" of adjacent zones are also provided (in addition to the pre-existing map tile of the central zone), the corresponding miniaturized versions of all the map tiles of the immediate "ring" of adjacent zones are also provided. Additionally, certain "mini-map" processing logic is also provided in response to the "initial" request.

As illustrated in FIG. 13, the "mini-map" processing logic first forms the mini-map 1220 of the "greater area" (that is, the central zone plus all the immediately adjacent zones having their map tiles provided), using the miniaturized versions of the map tiles 1222, and causes the mini-map 1220 to be superimposed on displayed map 1290 (block 1302). In one embodiment, the superimposition is effectuated within the same browser window (thereby advantageously enables the coordinated processing of cursor events). In one embodiment, this is accomplished by architecting the "mini-map" processing logic and the "mini-map" data as an extension object to the browser container. The "extension" object may be implemented in any one of a number of programming languages supported by the operating system, including, but not limited to, Visual C++, Java, Perl, and JavaScript.

As alluded to earlier, the "mini-map" processing logic also displays a "visible area" demarcation window 1224 depicting the portion of the "greater area" currently being displayed in detail as display map 1290, using the "full sized" version of the map tiles.

In this embodiment, the earlier described logic that renders the "full sized" versions of the map tiles (hereinafter, the "main" logic) is further equipped to re-direct a cursor event notification (provided, for example, by a window manager of the operating system) to the "mini-map" processing logic, upon receipt and determining that the notification is associated with a cursor event that occurred within the display screen area occupied by "mini-map" 1220.

Thus, upon displaying the "mini-map" and the associated "visibility area" demarcation, the "mini-map" processing logic awaits for notification of cursor events associated with the displayed "mini map" (block 1304). Upon receipt of a re-directed cursor event notification, it determines in what direction and by how much distance the user has "moved" the "visibility area" demarcation window 1224 (e.g. by "clicking" and "dragging" the "demarcation" with a cursor control device) (block 1306). Such determination may be made by the "mini-map" processing logic tracking the last known location of the "visibility area" demarcation window 1224, and comparing that with its new location (as depicted by the cursor event notifications). In response, the "mini-map" processing logic causes the "main" processing logic to refresh the "main" display accordingly (using the pre-provided map tiles of the immediate adjacent zones) (block 1308). Further, the "mini-map" processing logic updates the location of the "visibility area" demarcation to reflect the movement of the demarcation by the user (block 1310).

In one embodiment, as the user moves "visibility area" demarcation window 1224, the "mini map" processing logic further determines if demarcation window 1224 is within a predetermined threshold from a side of the mini-map 1220 (block 1312). If so, the "mini-map" processing logic requests that additional map tiles, (both the "fill" as well as the "miniaturized" versions) in the user's movement direction, be pre-fetched (block 1314). [Such pre-fetching may involving fetching of map tiles in both the horizontal and vertical directions to reflect "diagonal" movement by the user.]

Upon making the request or determining no request needs to be made at the present time (block 1312) or no cursor event notification was received at the present time (block 1304), the "mini-map" processing logic further determines if additional mini map tiles are received (block 1316). If so, the "mini-map" processing logic reconstitutes the mini-map 1220, continuously keeping the denoted visible area (corresponding to displayed map 1290) substantially in the center of the mini-map 1220 (block 1302). Thereafter, the process continues as earlier described.

Thus, it can be seen from the above description, a user may use the "mini-map" 1220, or more specifically, the "visibility area" demarcation window 1224, to easily pan and explore a "greater area" surrounding an original requested location. Accordingly, usability of user panning is further improved.

Points of Interest

Figure 14A:
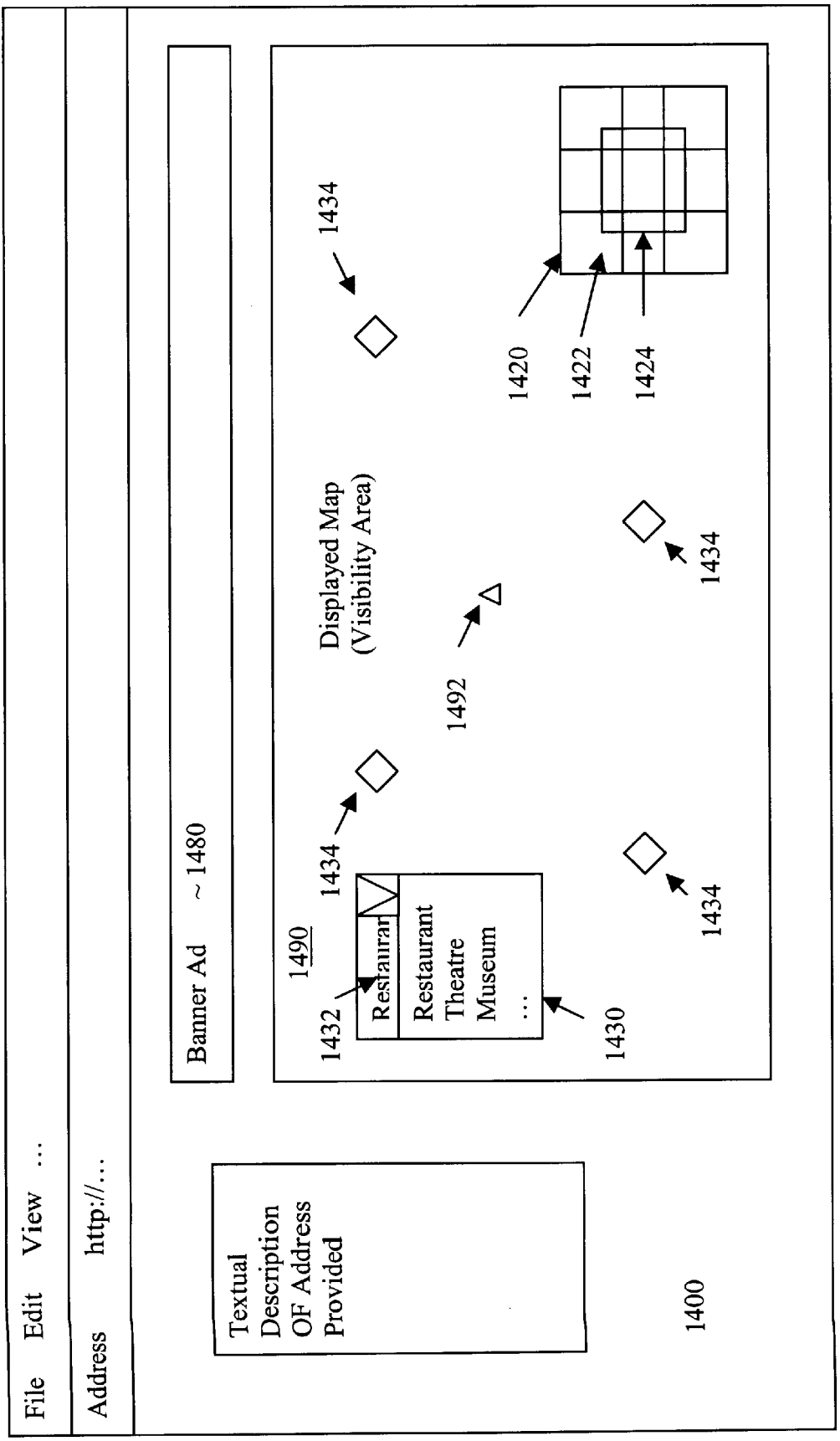
FIGS. 14a–14b—An end user view of the points-of-interest feature of the present invention.
Figure 14B:
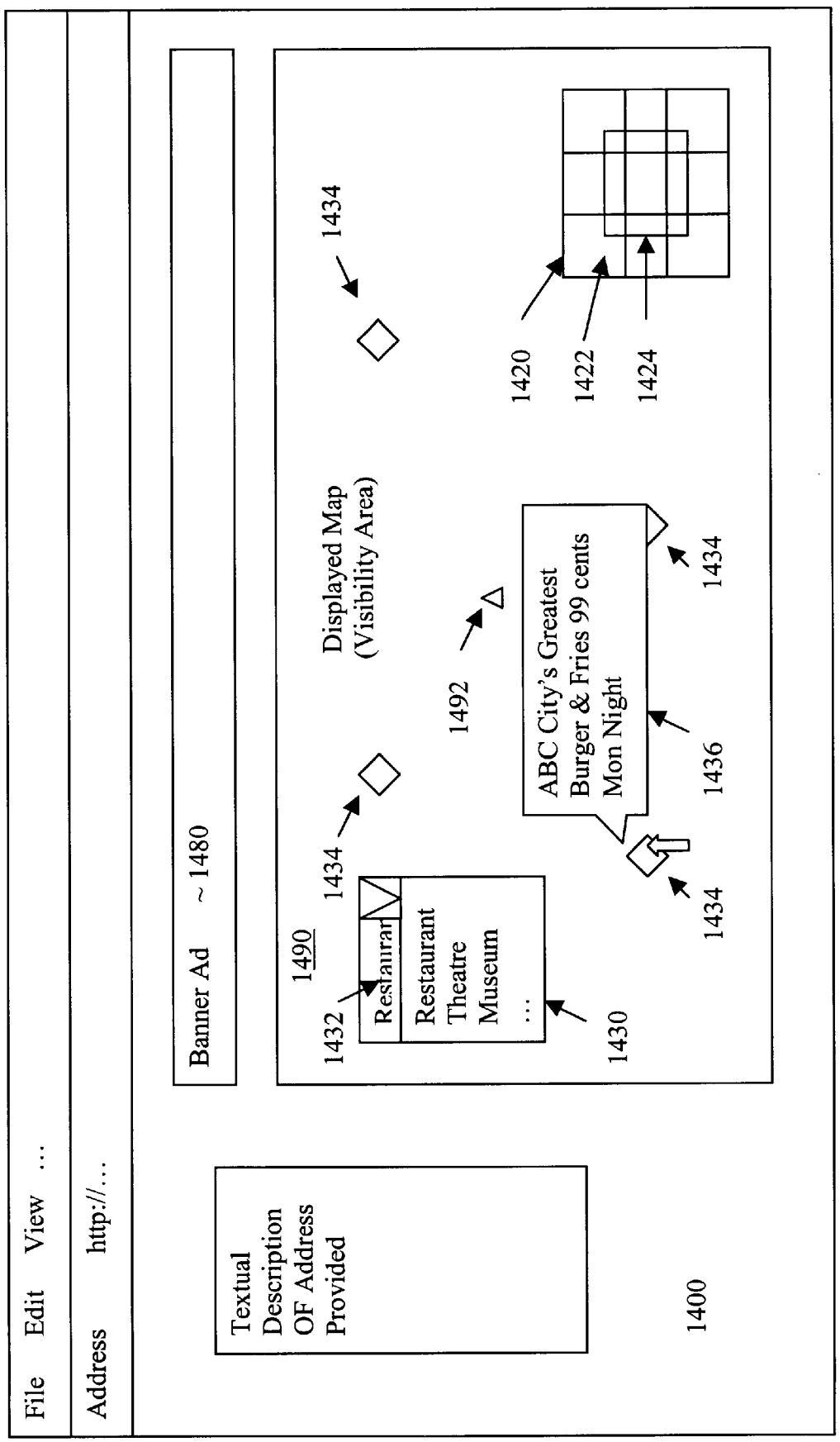
Figure 15:
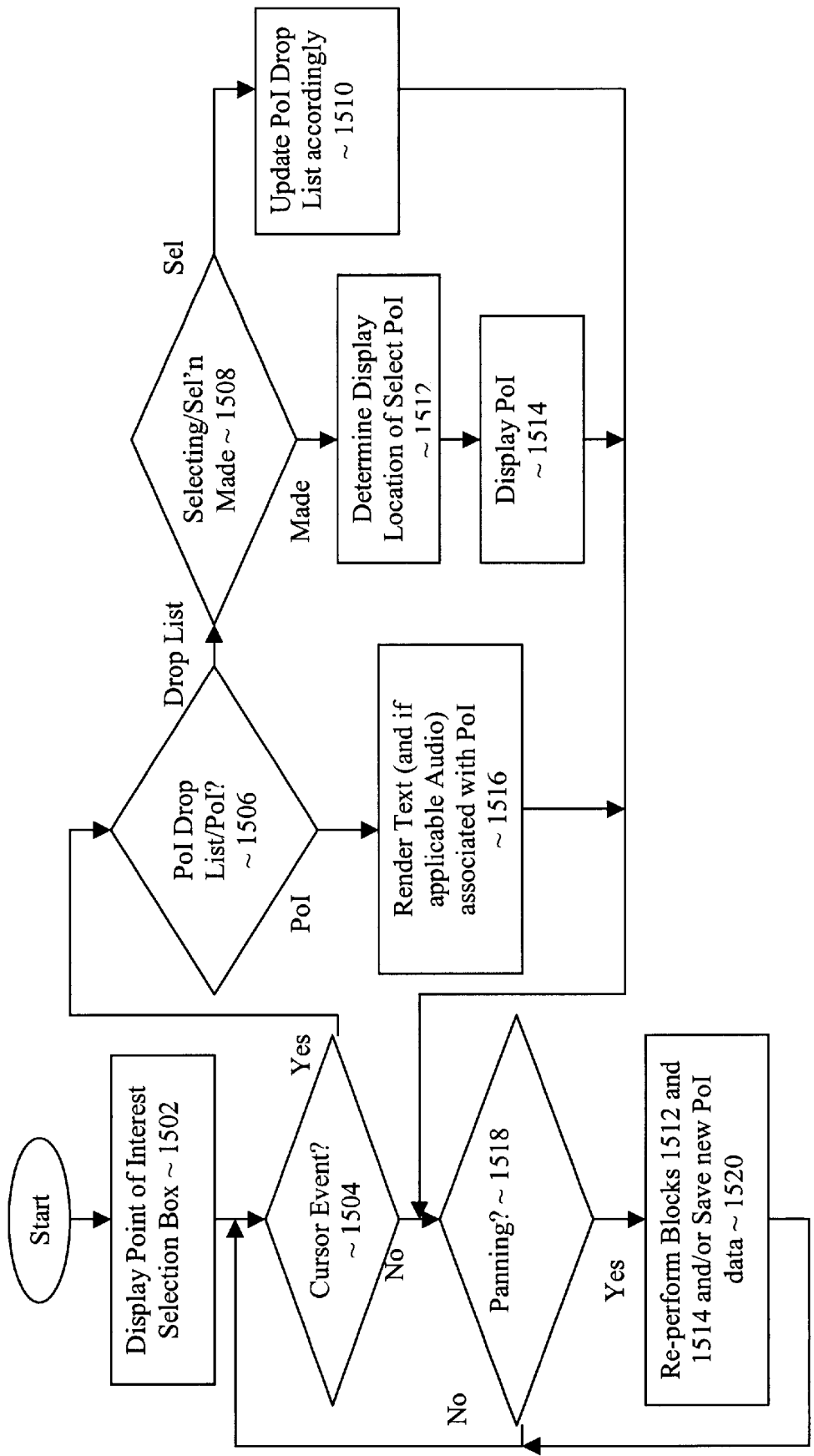
FIG. 15—A flow diagram of the operational flow of the relevant aspects of the points-of-interest processing logic of the present invention.

Referring now to FIGS. 14a–14b and 15, wherein two block diagrams of a user view of the present invention, illustrating an additional "points-of-interest" feature, and a flow diagram of the operational flow of the relevant aspects of the "points-of-interest" processing logic, are shown. As will be readily apparent from the descriptions to follow, the "points-of-interest" feature improves the usefulness of the electronic maps. As illustrated in FIGS. 14a–14b, in conjunction with a map display, "points-of-interest" 1434 of a selected type, located in the displayed area, may also be displayed (under user control). For the illustrated embodiment, a points-of-interest drop down list 1430 is provided to facilitate a user in selecting a "points-of-interest" type. Further, multi-media description 1436 may be associated with the points-of-interest, and they are rendered in response to the selection of the corresponding point-of-interest.

Examples of points-of-interest types include but are not limited to museums, restaurants, theaters, shopping centers, dry cleaners, and so forth. Of course, the points-of-interest types may be of finer or coarser granularities. For example, as opposed to a single "restaurant" point-of-interest type, different "restaurant" types like "Fast Food", "Italian restaurants", "French restaurants", "Chinese restaurants", and so forth may be offered instead.

The multi-media data describing the points-of-interest may include audio, textual as well as other descriptions. The description may convey information of any kind about the points-of-interest. For examples, the description may convey basic address, contact and/or direction information about a point-of-interest, current feature presentations (in the case of theaters, concert halls, museums and so forth), current menus (in the case of restaurants), or current sales (in the case of department stores).

To enable provision of this feature, data facilitating display of these points-of-interest and multi-media data facilitating their description are provided to the applicable map tiles, i.e. map tiles having points-of-interest. The data facilitating display of the points-of-interest include data identifying the points-of-interest type of each of the points-of-interest, data describing how points-of-interest of each of the points-of-interest types are to be depicted (typically, their graphical representations), and data describing their geographic locations (e.g. their geographical coordinates). These data are provided to the client along with the corresponding map tiles. Additionally, certain "points-of-interest" processing logic is also provided with the "initial" request.

As illustrated in FIG. 15, the "points-of-interest" processing logic first displays the points-of-interest type selection drop down list to facilitate a user in selecting a "point-of-interest" type (block 1502). For the illustrated embodiment, the points-of-interest type selection drop down list is advantageously superimposed on displayed map 1490. In one embodiment, the superimposition is effectuated within the same browser window (thereby advantageously enabling the coordinated processing of cursor events). In one embodiment, this is accomplished by architecting the "points-of-interest" processing logic and the associated data as an extension object to the browser "container". The "extension" object may be implemented in any one of a number of programming languages supported by the operating system, including, but not limited to. Visual C++, Java, Perl, and JavaScript.

Similar to the support of the "mini-map" feature, the earlier described logic that renders the map tiles (previously referred to as the "main" logic) is further equipped to re-direct a cursor event notification (provided, for example, by a window manager of the operating system) to the "points-of-interest" processing logic. The main logic performs the re-direction upon receipt of the notification and determining that the cursor event occurred within the display screen area occupied by "points-of-interest" drop down list 1430 or within a predetermined proximity of a displayed point-of-interest.

Thus, upon displaying the "points-of-interest" drop down list, the "points-of-interest" processing logic awaits notification of cursor events associated with the displayed "points-of-interest" drop down list or the points-of-interest themselves (block 1504). Upon receipt of a re-directed cursor event notification, the "points-of-interest" processing logic determines whether the cursor event is associated with the "points-of-interest" drop down list or with a displayed "point-of-interest" (block 1506). If the cursor event is associated with the "points-of-interest" drop down list, the processing logic further determines if the cursor event is associated with the locating of a "points-of-interest" type for selection (e.g. entry of an alphanumeric data into "points-of-interest" entry field 1432 or "clicking" on the "drop down arrow"), or with the actual selection of a "points-of-interest" type (e.g. clicking on a selection of the dropped down list) (block 1508). If the cursor event is associated with the locating of a "points-of-interest" type for selection, the drop down list is updated accordingly to reflect the user's interaction (e.g. echoing the entered alphanumeric data or dropping down the selection list) (block 1510). On the other hand, if the cursor event is associated with the actual selection of a "points-of-interest" type, the processing logic causes the points-of-interest of the selected type (more specifically, their graphical representations) to be displayed for the displayed map.

Figure 16:
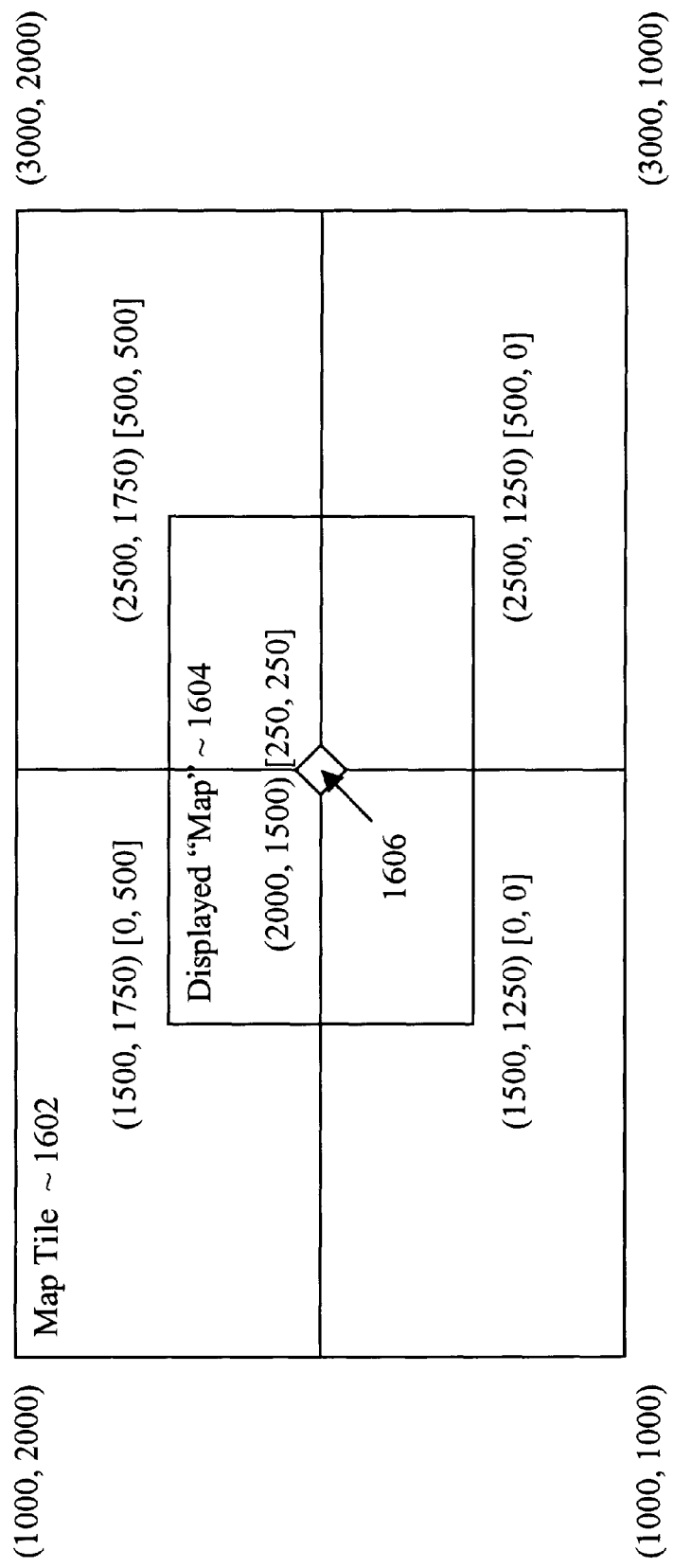
FIG. 16—Translating geographic coordinates to screen coordinates.

To display the points-of-interest, the processing logic, first determines the appropriate display screen coordinates for the applicable points-of-interest (block 1512). In one embodiment, this is accomplished by translating the geographic coordinates to the display screen coordinates, based on the geographical coordinates of the area displayed in the current displayed map (block 1512) (see, for example, FIG. 16). Thereafter, the processing logic displays the points-of-interest (their graphical representations) accordingly, using the determined display screen coordinates (block 1514).

Back at block 1506, if it was determined that the cursor event is not associated with the drop down list, i.e. associated with a displayed point-of-interest instead, the processing logic causes the description associated with particular point-of-interest to be rendered (block 1516). In one embodiment, at least the textual description is displayed (see, for example,. textual description 1436 of FIG. 14). Additionally, if the description includes an audio description, and the client is equipped with the necessary audio equipment (which may be determined, for example, at initialization time from the system configuration registry), the processing logic further renders the audio description.

Recall from earlier description, that user panning (whether performed in the prior art manner or using the mini-map feature of the present invention) will result in refreshing of the displayed map (using the additionally provided "adjacent" map tiles), and potentially pre-fetching of additional "adjacent" map tiles. Thus, for this embodiment, upon refreshing the drop down list feature to reflect the user's interaction (block 1510) or displaying points-of-interest (block 1512), or rendering multi-media description of a selected point-of-interest (block 1516), the processing logic determines if the user is panning or if additional "adjacent" map tiles are being received. If the user is panning and the displayed map is being refreshed, the processing logic re-performs blocks 1514 and 1516. That is, the processing logic will re-determine the appropriate display coordinates of the points-of-interest, and cause them to be re-displayed at the appropriate display screen locations. Further, if additional points-of-interest data have been received (as a result of the receipt of additional "adjacent" map tiles), the processing logic saves the received points-of-interest data (for potential subsequent use).

Thereafter, the process continues back at block 1504, and onto the other blocks as earlier described. Thus, it can be seen from the above description, the selectable "points-of-interest" with multi-media descriptions significantly enhance the usefulness of the displayed map.

Advantages Over Prior Art

As mentioned previously in the detailed description, a chief advantage of the current invention over the prior art is the static existence of the map tiles. In the prior art when a user attempts to pan in any direction, the server will have to dynamically generate the maps. This dynamic generation of maps has several disadvantages as previously discussed.

Another aspect of having maps generated real-time is that they are custom maps. These maps are generated and served up in a response to a very specific request. In contrast, the map tiles that are provided by the present invention are static map tiles that would be served to any client requesting a location in the zone covered by that map tile. As a result, there are circumstances where a likelihood exists that the map tiles would be requested with such frequency that they would be cached by a server nearer to the requesting client than the map server. If a user requests a map tile from one of these servers with the cached map tile, the service of a map tile from one of these caching servers would result in a reduction of the time required to get the correct map tile to the client.

Figure 10:
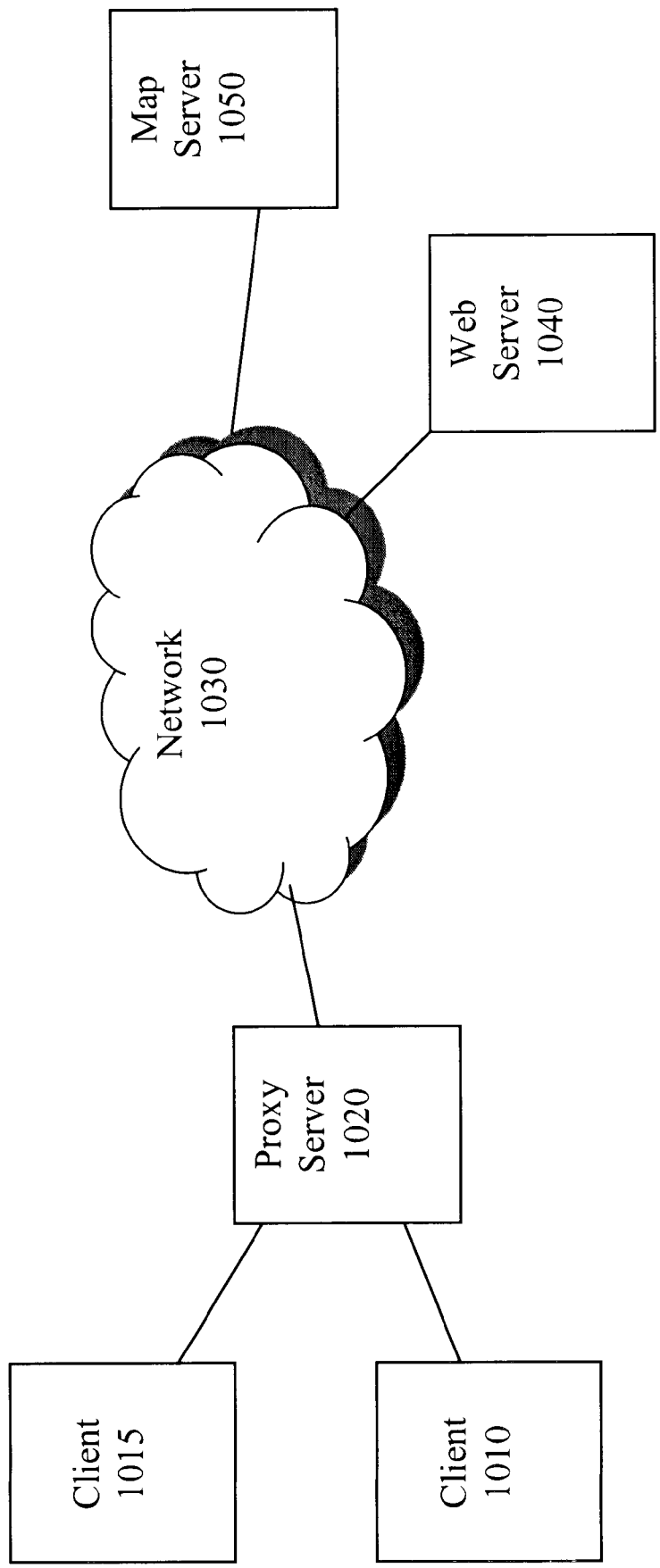
FIG. 10—A network architecture with an embodiment of the present invention.

As an example of this feature, refer to FIGS. 10 and 11. FIG. 10 shows an embodiment where the clients 1010 and 1015 are running local user agents and map server 1050 is serving up maps through the Internet. FIG. 11 shows a portion of an area serviced by a map server. This figure shows two locations of interest. The first location 1110 is an identifier of a location for which client 1010 is interested in obtaining a map. The second location 1115 is an identifier of a location for which client 1015 is interested in obtaining a map. In this embodiment, in addition to the central map tiles (and their associated data) being sent to each client, immediately adjacent map tiles (and their associated data) will also be sent. Resultantly, zone 32761 will be sent to client 1010 along with immediately adjacent maps 22750, 22751, 22752, 32760, 32762, 42770, 42771, and 42772 (and their associated data). Additionally, map tile 32765 (and its associated data) will be sent to client 1015 with immediately adjacent maps 22754, 22755, 77756, 32764, 32766, 42774, 42775, and 42777 (and their associated data). For the purpose of this part of the description, we will assume the earlier described embodiment, where the identifications of the adjacent map tiles may be inferred from the naming convention. Since client 1010 has requested a map for location 1110, a first inner area is sent to the client, including maps of zones 22750–22752, 32760–32762 and 42770–42772 (and their associated data). Assume that the user has decided to pan east (to the right as shown in FIG. 11) such that a request for additional data occurs when the client attempts to pan to an area in zone 32763. Since identification of the individual map tiles may be inferred from the naming convention, the client in possession of a map tile of zone 32762 will know the identification for the map tile immediately to its east is 32763. Resultantly the client 1010 will send a request to the map server for map 32763. However, this map tile (and its associated data) was sent to client 1015 when it requested the map tiles of the first inner area for requested location 1115. There is a likelihood that the proxy server 1020 will have cached the requested files that were sent to client 1015. Proxy server caching is well known in the art and will not be described further. As a result of the caching, the required files containing the map tile (and its associated data) for zone 32763 are present at the proxy and are sent to client 1015. This extinguishes the need for the request to travel to the map server 1050. This can greatly improve the response time of panning during the process of viewing the map tiles.

Thus, a method and apparatus for distributing and displaying maps electronically has been described. Those skilled in the art will appreciate that the present invention is not limited to the embodiments described. For example, consistent with the spirit and scope of the present invention, set forth by the claims below, the present invention may be modified to confer the benefits of the present invention to zooming and other like kinds of operations. Thus, the description is to be regarded as illustrative and not restrictive.

What is claimed is:

1. A method comprising:

receiving a requested location;

selecting, based on the requested location, a first pre-existing map tile and its corresponding miniaturized representation from a plurality of preexisting map tiles and their corresponding miniaturized representations, the first pre-existing map tile containing a representation of an area that comprises the requested location;

selecting further a first set of adjacent map tiles and their corresponding miniaturized representations from the plurality of preexisting map tiles and their corresponding miniaturized representations, the first set of adjacent map tiles containing representations of areas immediately adjacent to the area represented by the first map tile;

sending the selected first map tile, the miniaturized representation of the first map tile, the first set of adjacent map tiles, and the miniaturized representations of the first set of adjacent map tiles; and sending processing logic to form a mini map and a visibility area demarcation within the mini map, using said miniaturized representations of the map tiles, the visibility area demarcation denoting an area within the mini map corresponding to the area represented by the first map tile.

2. A method comprising:

receiving a requested location;

selecting, based on the requested location, a first pre-existing map tile and its corresponding miniaturized representation from a plurality of preexisting map tiles and their corresponding miniaturized representations, the first pre-existing map tile containing a representation of an area that comprises the requested location;

selecting further a first set of adjacent map tiles and their correspondinq miniaturized representations from the plurality of preexisting map tiles and their corresponding miniaturized representations, the first set of adjacent map tiles containing representations of areas immediately adjacent to the area represented by the first map tile;

sending the selected first map tile, the miniaturized representation of the first map tile, the first set of adjacent map tiles, and the miniaturized representations of the first set of adjacent map tiles;

selecting a second set of adjacent map tiles and their corresponding miniaturized representations from the plurality of preexisting map tiles and their corresponding miniaturized representations, the second set of adjacent map tiles containing representations of areas immediately adjacent to the area represented by the first set of adjacent map tiles; and sending the second set of adjacent map tiles and their corresponding miniaturized representations.

3. An apparatus comprising:

a storage medium having stored therein a plurality of executable instructions,
wherein when executed, the instructions operate the apparatus to receive a requested location,
select, based on the requested location, a first pre-existing map tile and its corresponding miniaturized representation from a plurality of preexisting map tiles and their corresponding miniaturized representations, the first pre-existing map tile containing a representation of an area that comprises the requested location, select further a first set of adjacent map tiles and their corresponding miniaturized representations from the plurality of preexisting map tiles and their corresponding miniaturized representations, the first set of adjacent map tiles containing representations of areas immediately adjacent to the area represented by the first map tile, send the selected first map tile, the miniaturized representation of the first map tile, the first set of adjacent map tiles, and the miniaturized representations of the first set of adjacent map tiles;

select a second set of adjacent map tiles and their miniaturized representations from the plurality of preexisting map tiles and their miniaturized representations, the second set of adjacent map tiles containing representations of areas immediately adjacent to the areas represented by the first set of adjacent map tiles, and send the second set of adjacent map tiles and their corresponding miniaturized representations; and at least one processor coupled to the storage medium to execute the instructions.

* * * * *

UNITED STATES PATENT AND TRADEMARK OFFICE
CERTIFICATE OF CORRECTION

PATENT NO. : 6,724,382 B2
DATED : April 20, 2004
INVENTOR(S) : Jeremy A. Kenyon et al.

It is certified that error appears in the above-identified patent and that said Letters Patent is hereby corrected as shown below:

<u>Title page,</u>
Item [57], ABSTRACT,
Line 7, "users client" should read -- user's client --;
Lines 15-16, "multi-media" should read -- multimedia --;

<u>Drawings,</u>
Sheet 13, Figure 12, reference no. "<u>1290</u>" should read -- 1290 --;
Sheet 15, Figure 14a, reference no. "<u>1490</u>" should read -- 1490 --;
Sheet 16, Figure 14b, reference no. "<u>1490</u>" should read -- 1490 --;

<u>Column 1,</u>
Line 32, "include; email" should read -- include: email --;

<u>Column 2,</u>
Line 1, "two-fold" should read -- twofold --;
Line 8, "time consuming process" should read -- time-consuming process --;
Line 13, "become less" should read -- becomes less --;
Line 15, "real time generation" should read -- real-time generation --;
Line 17, "real time graphical images" should read -- real-time graphical images. --;
Lines 32-33, "The current solutions current solutions always contact" should read -- The current solutions always contact --;

<u>Column 3,</u>
Lines 1-2, "as in the case with" should read -- as is the case with --;
Line 18, "pre-existing" should read -- preexisting --;
Line 22, "logic are" should read -- logics are --;
Line 23, "min-map" should read -- mini-map --;
Line 32, "logics causes" should read -- logics cause --;
Line 38, "point of interests" should read -- points of interest --;
Line 65, "architecture" should read -- architecture. --;

<u>Column 5,</u>
Line 7, "areas, however" should read -- areas; however, --;
Line 42, "the following;" should read -- the following: --;

<u>Column 7,</u>
Lines 14-15, "FIGS. 6 and 7 shows" should read -- FIGS. 6 and 7 show --;

<u>Column 9,</u>
Line 13, "areas then that" should read -- area than that --;

UNITED STATES PATENT AND TRADEMARK OFFICE
CERTIFICATE OF CORRECTION

PATENT NO. : 6,724,382 B2
DATED : April 20, 2004
INVENTOR(S) : Jeremy A. Kenyon et al.

It is certified that error appears in the above-identified patent and that said Letters Patent is hereby corrected as shown below:

Column 9 (cont'd),
Lines 54, 59 and 60-61, "pre-existing" should read -- preexisting --;

Column 10,
Lines 48 and 62, "mini map" should read -- mini-map --;
Line 55, "may involving fetching" should read -- may involve fetching --;

Column 11,
Lines 21, 33 and 43, "multi-media" should read -- multimedia --;

Column 13,
Lines 4 and 20, "multi-media" should read -- multimedia --;
Line 60, "77756" should read -- 22756 --;
Line 66, "1110,a first" should read -- 1110, a first --;

Column 14,
Lines 35 and 60-61, "a first pre-existing map" should read -- a first preexisting map --;
Lines 39 and 64, "the first pre-existing map" should read -- the first preexisting map --;
Line 52, "form a mini map" should read -- form a mini-map --;
Line 53, "within the mini map" should read -- within the mini-map --;
Line 56, "mini map corresponding to" should read -- mini-map corresponding to --;
Line 67, "correspondinq" should read -- corresponding --;

Column 15,
Lines 25-26, "a first pre-existing map" should read -- a first preexisting map --;

UNITED STATES PATENT AND TRADEMARK OFFICE
CERTIFICATE OF CORRECTION

PATENT NO. : 6,724,382 B2
DATED : April 20, 2004
INVENTOR(S) : Jeremy A. Kenyon et al.

It is certified that error appears in the above-identified patent and that said Letters Patent is hereby corrected as shown below:

Column 16,
Line 1, "the first pre-existing map" should read -- the first preexisting map --.

Signed and Sealed this

Twentieth Day of December, 2005

JON W. DUDAS
*Director of the United States Patent and Trademark Office*